United States Patent
Sasagawa et al.

(10) Patent No.: US 6,636,283 B2
(45) Date of Patent: Oct. 21, 2003

(54) FRONT LIGHT, REFLECTIVE LIQUID CRYSTAL DISPLAY DEVICE AND PERSONAL DIGITAL ASSISTANT

(75) Inventors: Tomohiro Sasagawa, Tokyo (JP); Kyoichiro Oda, Tokyo (JP); Akimasa Yuuki, Tokyo (JP); Naoto Sugawara, Tokyo (JP); Masahiro Yokoi, Tokyo (JP); Masahisa Moroda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 267 days.

(21) Appl. No.: 09/819,624

(22) Filed: Mar. 29, 2001

(65) Prior Publication Data

US 2001/0035927 A1 Nov. 1, 2001

(30) Foreign Application Priority Data

Mar. 31, 2000 (JP) .......................... 2000-097030
Jan. 30, 2001 (JP) .......................... 2001-021844

(51) Int. Cl.⁷ ............................................ G02F 1/1335
(52) U.S. Cl. ........................................ 349/65; 362/31
(58) Field of Search ............................. 349/65, 10, 24, 349/5; 359/599; 362/31

(56) References Cited

U.S. PATENT DOCUMENTS

| | | | |
|---|---|---|---|
| 4,765,701 A | | 8/1988 | Cheslak |
| 4,915,486 A | * | 4/1990 | Hansen ........................ 349/24 |
| 5,461,547 A | * | 10/1995 | Ciupke et al. ................ 362/31 |
| 5,485,354 A | * | 1/1996 | Ciupke et al. ................ 362/31 |
| 5,664,862 A | * | 9/1997 | Redmond et al. ............. 362/31 |
| 5,801,793 A | * | 9/1998 | Faris et al. .................... 349/5 |
| 5,828,427 A | * | 10/1998 | Faris ............................. 349/5 |
| 6,028,649 A | * | 2/2000 | Faris et al. ................... 349/10 |
| 6,275,339 B1 | * | 8/2001 | Chazallet et al. ........... 359/599 |
| 6,293,683 B1 | | 9/2001 | Okada |
| 6,323,919 B1 | | 11/2001 | Yang et al. |
| 6,414,728 B1 | * | 7/2002 | Faris et al. .................... 349/10 |
| 6,507,378 B1 | | 1/2003 | Yano et al. |

FOREIGN PATENT DOCUMENTS

| | | |
|---|---|---|
| JP | 3-261988 | 11/1991 |
| JP | 4-332401 | 11/1992 |
| JP | 5-264995 | 10/1993 |
| JP | 2782702 | 3/1995 |
| JP | 7-114024 | 5/1995 |
| JP | 7-159620 | 6/1995 |
| JP | 7-333442 | 12/1995 |
| JP | 8-94844 | 4/1996 |
| JP | 8-254617 | 10/1996 |
| JP | 9-163079 | 6/1997 |
| JP | 9-330611 | 12/1997 |

(List continued on next page.)

OTHER PUBLICATIONS

Hikari Hogaku Handbook, Kabushiki Kaisha Asakura Shoten, Feb. 20, 1986, pp. 144–149.

Primary Examiner—John F. Niebling
Assistant Examiner—Olivia T Luk
(74) Attorney, Agent, or Firm—Leydig, Voit & Mayer, Ltd.

(57) ABSTRACT

A compact and light weight front light, a reflective liquid crystal display device, and a personal digital assistant providing an image display of uniform brightness with high efficiency are provided. The front light includes a main optical guide plate and a second optical guide plate. The second optical guide plate is arranged at an end of the main optical guide plate along the widthwise direction, and, on an end surface opposite an end surface facing the main optical guide plate, grooves forming prisms are aligned along the longitudinal direction, extending in the depth direction. The front light further includes a point light source arranged at an end, in the longitudinal direction, of the second optical guide plate, and a reflective film covering the surfaces of the grooves.

22 Claims, 29 Drawing Sheets

FOREIGN PATENT DOCUMENTS

| | | |
|---|---|---|
| JP | 10-26708 | 1/1998 |
| JP | 10-221529 | 8/1998 |
| JP | 10-255532 | 9/1998 |
| JP | 10-260405 | 9/1998 |
| JP | 10-326515 | 12/1998 |
| JP | 11-38232 | 2/1999 |
| JP | 11-41172 | 2/1999 |
| JP | 11-149813 | 6/1999 |
| JP | 11-202785 | 7/1999 |
| JP | 11-231320 | 8/1999 |
| JP | 11-232919 | 8/1999 |
| JP | 11-238408 | 8/1999 |
| JP | 11-242220 | 9/1999 |
| JP | 11-242222 | 9/1999 |
| JP | 11-260128 | 9/1999 |
| JP | 11-282388 | 10/1999 |
| JP | 11-326903 | 11/1999 |
| JP | 2000-11723 | 1/2000 |
| JP | 2000-89031 | 3/2000 |
| JP | 2000-111900 | 4/2000 |
| JP | 2000-267583 | 9/2000 |
| JP | 2001-35227 | 2/2001 |
| JP | 2001-319516 | 11/2001 |
| WO | WO 96/17207 Y | 6/1996 |

\* cited by examiner

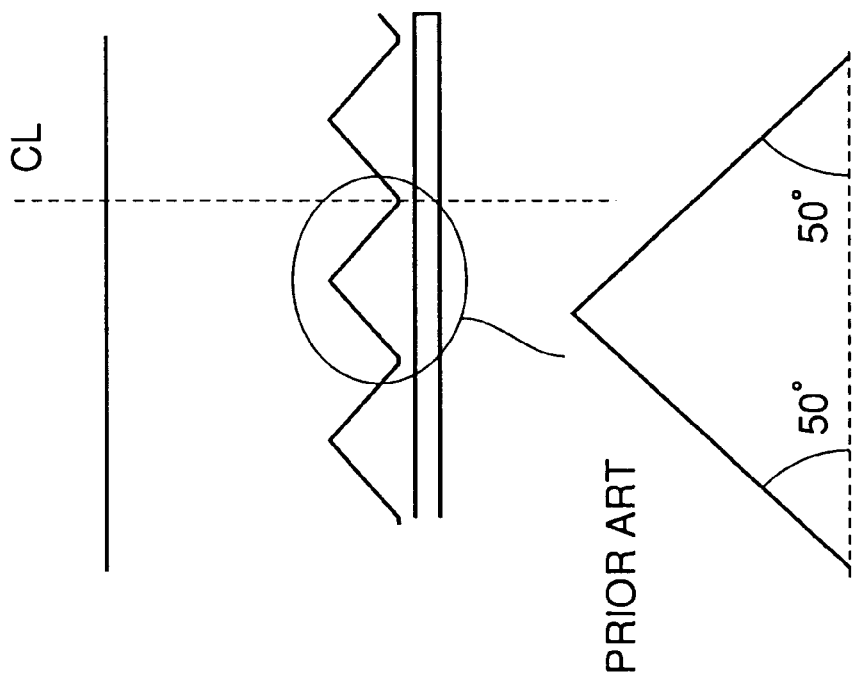
FIG.62B PRIOR ART
FIG.62C PRIOR ART
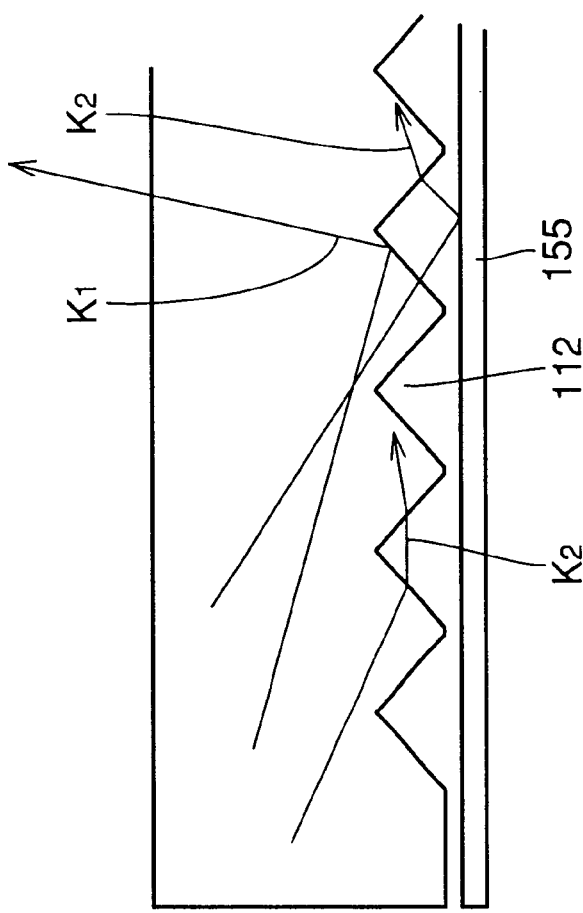
FIG.62A PRIOR ART

FRONT LIGHT, REFLECTIVE LIQUID CRYSTAL DISPLAY DEVICE AND PERSONAL DIGITAL ASSISTANT

BACKGROUND OF THE INVENTION

1. Field of the Invention

The present invention relates to a front light arranged in front of a display device to improve brightness and uniformity of brightness of the image plane on the display device, as well as to a reflective liquid crystal display device and a personal digital assistant.

2. Description of the Background Art

FIG. 57A is a schematic cross section representing an example of a conventional front light (Japanese Patent Laying-Open No. 8-94844). FIG. 57A shows a cross section of the front light as a whole, and FIG. 57B is a partially enlarged illustration of an upper surface of an optical guide plate. The optical guide plate 101 of the front light has a surface 101a (hereinafter referred to as the "first surface") opposing to the display device 130 and an upper surface 101b (hereinafter referred to as a "second surface") opposite to the first surface, and on the second surface, a plurality of grooves each having a prism-shaped cross section are provided extending as ribs in the widthwise direction. The front light is placed in front of a reflective liquid crystal display device, that is, on the side of a viewer viewing the displayed image plane, and emits light toward the display device. In the front light 110, a light beam entering from a light source 103 to the optical guide plate 101 proceeds through the optical guide plate 101 away from the light source, while the beam is reflected by a reflective surface 121 of a steep slope, which is one surface of the prism on the second surface 101b, and emitted to the side of the first surface, approximately perpendicular to the optical guide plate. Therefore, as shown in FIG. 57B, the reflective surface forms an angle of about 43° with a hypothetical bottom plane of the prism, and a gentle slope 122, which is the other surface of the prism, forms an angle not larger than 10° with the bottom surface. The height of each prism is set to be 5 μm to 50 μm so as to reflect light of approximately the same intensity at various portions from end to end of the optical guide plate, to ensure uniform brightness in the plane. Along an end surface of the optical guide plate, light source 103 such as a cold cathode tube is arranged, and a light beam emitted from the light source enters the optical guide plate from that end surface and propagated through the optical guide plate. The light entering the optical guide plate propagates while repeating regular reflection at certain portions of the first and second surfaces 101a and 101b, and when the beam reaches the reflective surface 121 of the second surface, the beam is reflected and emitted approximately vertically, from the first surface 101a of the optical guide plate. Reflector plates 104 are arranged on an outer side of light source 103 and at the other end of the optical guide plate, so as to prevent any loss of light intensity. Further, the first and second surfaces are protected by a light transmitting layer 120. The light emitted from the optical guide plate enters the reflective display device 130, reflected by a reflecting member (not shown) arranged behind the liquid crystal, and returns to the optical guide plate 101. For convenience of description, in the following, the term "display device" refers to the "display apparatus" with the front light excluded. During the progress, the light beam is modulated in the display device, and passes through the optical guide plate in the thickness direction to form an image on the screen, which is viewed by the viewer. When uniformity of light intensity in the plane is to be ensured by the front light, it is necessary to change area ratio of the reflective surface of the second surface 101b from portion to portion. It is impossible to change the area ratio of the reflective surface while keeping constant the angle of the prism structure. Therefore, in order to obtain high uniformity, it is necessary to change the angle of the prism structure. An optical guide plate having the prism angle varied in one same plane is difficult to process and to fabricate with high precision, resulting in higher cost.

FIG. 58A is a schematic cross section representing another example of the conventional front light (Japanese Patent Laying-Open No. 10-326515). FIG. 58A is a cross section of the front light as a whole, and FIG. 58B is a partially enlarged illustration of the second surface 101b of optical guide plate 101. The second surface 101b of the guide plate in the front light is stepwise, including a flat portion 123 that is parallel to the first surface, and a reflecting portion 121 forming an angle of about 45° with the flat portion. The light beam proceeding through the optical guide plate encounters the reflecting portion 121 and reflected approximately vertically to the optical guide plate, and emitted from the optical guide plate. In connection with the conventional front light described above, the following proposal has been made. More specifically, the ratio of the reflective surface inclined by 45° described above, which is the cause of loss of the light when the light is reflected by the liquid crystal panel or when the light passes again through the depth direction of the optical guide plate, or when ambient light passes through the optical guide plate, is set to at most (1/20), so as to reduce the loss (Japanese Patent Laying-Open No. 11-202785).

Further, referring to FIG. 59, a proposal has been made in which prism-shaped grooves 112 are provided in optical guide plate 101, with one inclined surface of each groove is made to have the inclination in the range of 35° to 55° and the other inclined surface is made to have the inclination in the range of 60° to 90° (Japanese Patent Laying-Open No. 11-242222). The light beam proceeding in the optical guide plate encounters the inclined surface in the range of 35° to 55° as in the conventional examples, reflected therefrom and emitted to the outside of the optical guide plate. Further, referring to FIG. 60A, a method has been proposed in which the depth of the grooves is made gradually deeper further away from the light source so that the intensity of the emitted light becomes uniform, or referring to FIG. 60B, a method of adjustment has been proposed in which the pitch between the grooves is made gradually narrower further away from the light source, so that the intensity of emitted light is made uniform regardless of the positions.

In order to prevent degradation of display quality by moire fringes resulting from interference of the pitch of the prism structure and the pixel pitch of the display device, a proposal has been made in which the period of the prism structure is limited to the range of 1/(1.3+N) to (1/1.6+N) of the pixel period (Japanese Patent Laying-Open No. 11-260128).

Further, a proposal has been made in which an anti reflection film is provided on the first surface of the optical guide plate, so as to prevent lowering of display contrast caused by reflection at the first surface when the light is emitted from the optical guide plate (Japanese Patent Laying-Open No. 11-242220).

The optical guide plates of the conventional front lights each have the prism-shaped structure. Therefore, in most cases, the rib-shaped or fringe-shaped prism structure is visually recognized by the viewer, lowering the display quality. Further, as the light beam is reflected by the liquid crystal panel and again passes through the optical guide plate, the light beam is refracted to different directions at surfaces of different angles, resulting in the problem that double images are generated. Further, the above described prism optical guide plates all utilize the method in which the direction of progress of the light is changed by the regular reflection at the reflective surface of the prism, so that the light is emitted from the optical guide plate. Therefore, characteristic of the emitted light significantly vary along the direction of progress of the light beam in the optical guide plate. When the light beam is refracted at a corner of the optical guide plate and the refracted light enters the optical guide plate at an angle different from the remaining light beams, the light beam from the different angle appears as a strong emission line even after it is reflected by the prism, considerably degrading the display quality.

When a point light source such as an LED (Light Emitting Diode) is used as the light source, a proposal has been made in which the light is made uniform by a guide structure arranged at an end portion of the optical guide plate before entering the optical guide plate, as shown in FIGS. 61A and 61B. In the method in which the light is reflected at the prism-shaped projections at the second surface of the optical guide plate so as to extract the light out from the optical guide plate, it is necessary to make uniform the light spatially and, in addition, to make the pitch of reflective grooves of the light extracting mechanism of the edge optical guide plate (second optical guide plate) to be a prescribed value or smaller. Otherwise, significant unevenness results in the illumination. When the light entering the optical guide plate has wide angular distribution, the emitted light also comes to have wide angular distribution, and hence it becomes difficult to attain high brightness.

The front light of the type using the point light source shown in FIGS. 61A and 61B described above is suitable for reduction in size and weight. Accordingly, use of this type of front light has been increased, as the front light of a liquid crystal display device of personal digital assistants, represented by a mobile phone (Japanese Patent Laying-Open No. 10-260405).

The conventional front lights having the above described structures have the problems that the fringe-shaped prism structure of the optical guide plate is visually recognized, and display quality is degraded because of emission lines or unevenness. Further, it has been impossible to control angular distribution of the emitted light from the front light, and hence it has been difficult to ensure high brightness.

In the front light having such a structure as shown in FIGS. 61A and 61B using a point light source, it is the main object to obtain a display image of high brilliance with small power consumption. For this purpose, a structure has been used in which an edge optical guide plate (second guide plate) is arranged at a side edge of the main optical guide plate, and on a surface (fourth surface) of the edge optical guide plate that is opposite to the surface facing the main optical guide plate, reflective grooves for extracting light beams are provided. In this structure, referring to FIG. 62A, the light entering from an LED to the edge optical guide plate (second optical guide plate) will be a light beam K1 regularly reflected by the incline surface of the reflective groove 112, and a light beam K2 reflected and emitted to the outside and thereafter reflected by a reflector 155 and incident on the second optical guide plate from the outside. In order to suppress the loss of light at the reflection and diffraction, the angle formed by each of the two sides of the prism-shaped groove and a flat portion is made about 50°, as can be seen from FIGS. 62B and 62C.

When the above described light beams K1 and K2 proceed to the light emitting surface (third surface) of the second optical guide plate facing the main optical guide plate within a prescribed angular range, the beams are emitted from the light emitting surface and introduced to the main optical guide plate. When the light beams proceed to the light emitting surface out of the prescribed angular range, the light beams are regularly reflected at the light emitting surface, and proceed through the second optical guide plate. When the second optical guide plate is larger than a prescribed size, the ratio of the light beam regularly reflected at surfaces other than the light emitting surface of the second optical guide plate is high, and the ratio of light beams emitted to the outside is small. Therefore, when the second optical guide plate is larger than the prescribed size, efficiency, that is, the ratio of the light beam emitted from the light emitting surface and eventually introduced to the main optical guide plate to emitted from the point light source, is at a high level.

It should be noted, however, that the above described efficiency lowers when the two-dimensional size is small, as in the case of a front light of a liquid crystal display device mounted on a personal digital assistant, and hence it becomes difficult to obtain a display image of a desired brightness. In order to support the rapid development of the personal digital assistants, it has been strongly desired to enhance the efficiency described above, in the front light using the point light source.

SUMMARY OF THE INVENTION

An object of the present invention is to provide a small and compact, economically advantageous front light that does not generate emission lines or unevenness but provides display of high quality with high efficiency and uniform brightness, as well as to provide a reflective liquid crystal display device and a personal digital assistant using the front light.

The present invention provides a front light arranged in front of a display device, including: a main optical guide plate; a second optical guide plate having its longitudinal direction arranged to extend along widthwise direction of and at an end portion of the main optical guide plate, the second optical guide plate having an end surface facing the main optical guide plate and an opposite end surface, the opposite end surface including a plurality of prism-shaped grooves extending in depth direction, formed along the longitudinal direction; a point light source arranged at an end of the longitudinal direction of the second optical guide plate; and a reflective film coated on a surface of the prism-shaped grooves.

By this structure, the surface of the prism-shape grooves constituting the light extracting mechanism is coated with a reflective film. Therefore, at the second optical guide plate of which length is not longer than a prescribed length, reflective light with superior directivity can be obtained, with reduced loss of the light intensity. Here, as the light is scattered and reflected by the grooves, it is possible to make uniform the average light intensity averaged over all directions, at every position of the second optical guide plate.

As already described, when the two-dimensional size is small as in the case of a front light of a reflective liquid crystal display device mounted on a personal digital assistant, the above described efficiency becomes low without reflective film, and it becomes difficult to obtain the display image of a desired brightness. When the reflective film is provided on the surface of the prism-shape groove, no light beam goes out from the second optical guide plate through the surfaces of the groove, and the light is reflected by the reflective film, so that light beam of high directivity is emitted from the light emitting surface (third surface). The reflection loss generated at the time of reflection at the reflective film is as high as 10% or more. Therefore, if the second optical guide plate is longer than the prescribed length and the reflection is repeated, the efficiency becomes even lower than the second optical guide plate not having the reflective film. More specifically, when the second optical guide plate becomes longer than a prescribed value, the conventional second guide plate not having the reflective film on the surface of the grooves would have higher efficiency, as the propagation loss is smaller. The length that can assure improved efficiency when the reflective film is provided on the surface of the prism-shaped grooves is at most 70 mm to 100 mm, when the general reflection loss with the ordinary width size is about 10%, though it depends on the width of the second optical guide plate and on the magnitude of reflection loss at the reflective film. Therefore, when the length of the second optical guide plate is at most 70 mm to 100 mm, provision of the reflective film as a coating on the surface of the prism-shaped grooves is effective. The relation between the length of the second optical guide plate with the reflective film provided on the surface of the grooves and the length has not been known.

As the reflective film, generally, a metal film formed by vapor deposition or sputtering is used. It is possible to reduce the loss by placing a reflector plate or the like in place of the reflective film formed of a metal film. However, the light beam that once goes out from the grooves of the second optical guide plate, reflected by the reflector plate and returned to the groove portions come to have wide width in the direction of progress, and hence directivity is considerably degraded. It is essential to prevent the loss by preventing the light from going out from the second optical guide plate through the grooves, by applying the reflective film. Not only a film but any material may be used, provided that the material is flexible and capable of covering all the surfaces of the grooves, such as a reflective sheet, different from the rigid material such as the reflector plate. More specifically, the above described reflective film may include such a reflective sheet, a reflective film, a reflective tape, a coated film, a paste and the like.

By the above described structure, it becomes possible to provide uniform and highly bright display image of a mobile phone or the like, using a point light source of LED or the like. Generally, it is a common practice to provide a reflector from the side of the fourth surface of the second optical guide, covering the surface of the second optical guide plate to the main guide plate, so as to enhance the efficiency. A silver tape is provided on the inner surface of the reflector. When the reflective film described above is used, the efficiency can be improved, and therefore, the silver tape on the inner surface of the reflector may be eliminated. Further, the reflector itself may be eliminated.

In the front light according to the present invention described above, desirably, each of the two sides constituting the prism-shape forms an angle of 30° to 38° with a flat portion, when viewed two-dimensionally.

As the two sides constituting the prism-shape of the groove each form an angle of 30° to 38° with the flat portion, it is possible to obtain reflected light beam of high directivity, with small widthwise spread from the direction vertical to the second optical guide plate as the center. The angular range is suitable for the prism-shaped grooves with reflective film provided thereon, and such an angular range had not been considered for the conventional prism-shaped grooves without the reflective film (for such grooves, the angle has been about 50°). When the grooves are coated with the reflective film, it is possible to emit light with high directivity, with this small angle of 30° to 38°, and hence brightness of the display image can be improved. Though it is easier to manufacture and less expensive to have the two sides of every prism-shaped groove at the same angle within the range of 30° to 38°, it is not necessary that the two sides are at the same angle. Further, it is not necessary that all the grooves have the same angle.

In the front light of the present invention, preferably, an area coated with the reflective film of the second optical guide plate extends exceeding the end portion of the main optical guide plate when the main optical guide plate and the second optical guide plate are viewed in a direction from the second optical guide plate to the main guide plate.

Because of this structure, a portion where light is not introduced from the second optical guide plate is not generated in the main optical guide plate. Therefore, the light is emitted from the entire surface of the main optical guide plate to the display device, and unevenness of brightness and darkness as well as undesirable recognition of border lines between the bright and dark portions can be avoided.

In the front light of the present invention, the grooves may be provided such that the angle formed by the side constituting the prism-shape with the flat portion vary along with the distance from the point light source.

By this structure, when the intensity of light proceeding toward the light emitting surface varies with the distance from the point light source or when the angle toward the light emitting surface vary, it is possible to make uniform the light intensity, or to have the angles within a prescribed range near vertical to the light emitting surface, by varying the angle of the side of the prism-shape. When the angle is not changed, the prism has the shape of an isosceles triangle when viewed two-dimensionally. When the angle is to be changed as in the present structure, the shape may or may not be the isosceles triangle. Further, as the angle varies, the depth of the prism-shaped grooves also changes naturally.

In the front light of the present invention, the angle formed by a side constituting the prism-shape with the flat portion may be increased as the grooves are positioned further away from the point light source.

When the angle formed by a side of the groove and the flat portion is made constant regardless of positions in the second optical guide plate, a phenomenon is observed, in which the direction of emission of the light emitted from the light emitting surface (third surface) is inclined between an end portion near the point light source and a central portion away from the light source. The inclination of the direction of emission should be avoided, as it may cause uneven brightness. By changing the angle of inclination of the prism near the point light source and the central portion as described above, it becomes possible to limit the emission angle distribution to be within a prescribed range.

In the front light of the present invention, it is desired that pitch of the grooves is not larger than the pixel pitch of the display device.

In the main optical guide plate, the light propagating through the main optical guide plate is emitted, utilizing mirror surface reflection from the prism. Therefore, light beams proceeding in different directions in the main optical plate are emitted in different directions, when emitted from the main optical plate. At portions immediately corresponding to the bottom points of the grooves of the second optical guide plate, light beams reflected by the grooves and emitted approximately vertical from the end surface of the second optical guide plate are dominant. The light beam emitted approximately vertical from the end surface of the second optical guide plate are reflected by the inclined surfaces of the prism-shaped projections, which are approximately vertical to the direction of progress of the light beams and extending in the widthwise direction of the main optical guide plate, in the main optical guide plate, and emitted in approximately vertical direction, from the main optical guide plate. At portions between the bottom points of the grooves, light beams reflected by grooves on both sides and emitted obliquely from the end surface of the second optical guide plate are dominant. The light beams are directed obliquely to the prism-shaped projections of the main optical guide plate, and therefore, even after reflected at the inclined surfaces of the projected portions, the light beams are emitted not vertically but obliquely inclined manner with respect to the main optical guide plate. Even after reflected by the display device, the light beams that have been emitted vertically contribute more effectively to the front brightness, than the obliquely emitted light beams. Therefore, at central portions between the bottom points of grooves where light beams are not much emitted vertically, the front brightness becomes lower than the portions immediately corresponding to the bottom points, even when the emission intensity is the same. Therefore, fringe-shaped unevenness of brightness is observed. When the pitch between the grooves is made not larger than the pixel pitch, the unevenness of brightness can be made unrecognizable.

In the front light of the present invention, it is desired that the groove pitch is at most 0.3 mm.

By this structure, unevenness of brightness can be made comparable to or lower than the ordinary pixel pitch, and hence illumination recognized as uniform can be provided. Even when there is no information as to the pixels of the display device, the front light may be manufactured with this groove pitch, as the common pixel pitch is about 0.3 mm. Thus, a front light that can be used for various and many applications, including wide variety of display devices, can be provided. When very high uniformity of illumination is required, the groove pitch described above should desirably be 0.2 mm or smaller.

In the front light of the present invention, the end portion of the main optical guide plate on the side of the second optical guide plate is tapered from opposing sides such that the central portion of the end portion protrudes most to the second optical guide plate, the end surface facing the main optical guide plate of the second optical guide plate is tapered from opposing sides such that the central portion of the end surface is recessed most from the main optical guide plate, conforming to the tapered shape of main optical guide plate, and the main optical guide plate and the second optical guide plate are positioned with the tapered shapes fitted with each other.

By this structure, of the light beams entering from the point light source to the second optical guide plate, those reaching the tapered end surface of the second optical guide plate are regularly reflected, directed to the prism-shaped grooves coated with the reflected film and positioned on the opposite end surface, reflected therefrom and directed to the main optical guide plate. Those of the light beams that are not reflected at the tapered end surface of the second optical guide plate but refracted are partially reflected at a surface at the end portion of the taper of the main optical guide plate, which reflected light beams again enter the second optical guide plate, directed to and reflected by the surfaces of the prism-shaped grooves, and directed to the main optical guide plate. Thus, the light beams emitted from the point light source can be introduced with high efficiency to the prism-shaped reflective grooves coated with the reflective film, of the second optical guide plate. As a result, the light beams can be used with higher efficiency.

In the front light of the present invention, desirably, the reflective film is a thin film formed of any of aluminum, silver, gold, copper and platinum.

A reflective film having high reflectivity in the entire range of visible light and free of wavelength dependency is desired. A reflective film satisfying these conditions include aluminum (At) and silver (Ag) thin films. Platinum (Pt) may also be used, though it has slightly lower reflectivity. Further, emission spectrum of white LED generally used as the point light source has high peak on the blue side of shorter wavelength, as white color is attained generally by wavelength-converting blue LED by a fluorescent body. It is sometimes preferable to adjust white balance so as to lower reflectivity on the shorter wavelength side, so that emission spectrum becomes uniform regardless of the waveform. Gold (Au) and copper (Cu) may be used for this purpose, as it has reflectivity higher on the longer wavelength side and lower on the shorter wavelength side.

By using these metal films as the reflective film, it becomes possible to form a thin film having high reflectivity and high durability, easily by a known method such as vapor deposition or sputtering. To attain high reflectivity and high durability, the metal film may have the thickness of at least 25 nm and more desirably, at least 50 nm.

In the front light of the present invention, the reflective film may be formed on an underlying film formed on the surface of the prism-shaped grooves.

The main optical guide plate and the second optical guide plate are generally formed of resin materials. When a metal film is directly formed on the resin material, sometimes adhesion therebetween is not sufficient. By forming an underlying film such as $SiO_2$ that provides sufficient adhesion both with the metal film and the resin material, and by coating the metal film thereon, sufficient adhesion and durability can be attained. Further, the interface between the underlying film and the metal film can be maintained in a flat, free-of-impurity state and hence increased reflectivity can be expected. When increase in reflectivity is desired, the index of refraction and the thickness of the underlying film may be controlled such that reflection at the interface between the resin material and the underlying film and reflection at the interface between the underlying film and the metal film interfere and reinforce with each other, thus providing a multi-layered reflection enhancing film.

In the front light of the present invention, the surface of the prism-shaped grooves may be roughened.

By the roughening process, adhesion of the reflective film can be improved. The roughening process may include blasting. The metal film may be coated with an underlying film interposed, on the roughened surface, or the metal film can directly be coated on the roughened surface, without the underlaying film.

In the front light of the present invention, a scattering member may be provided on the side of that surface of the second optical guide plate which opposes to the main optical guide plate.

By the scattering attained by the scattering member, light beams spatially made uniform can be introduced to the main optical guide plate.

The scattering member is effective to make uniform the light intensity spatially, when the pitch of the prism-shaped grooves is large.

In the front light of the present invention, desirably, an LED (Light Emitting Diode) is used as the point light source.

By the use of LED, the front light can be made compact, light, less power consuming, and driving voltage therefor can be lowered. As the driving voltage becomes lower, the number or scale of the battery to be mounted can be reduced. Thus, by the adoption of the LED, it becomes possible to use the front light in wider applications, for example, as a front light for personal digital assistant including mobile phones.

The present invention provides a reflective liquid crystal display device having a front light on a front side facing a viewer, the front light including a main optical guide plate; a second optical guide plate having its longitudinal direction arranged to extend along widthwise direction of and at an end portion of the main optical guide plate, the second optical guide plate having an end surface facing the main optical guide plate and an opposite end surface, the opposite end surface including a plurality of prism-shaped grooves extending in depth direction, formed along the longitudinal direction; a point light source arranged at an end of the longitudinal direction of the second optical guide plate; and a reflective film coated on a surface of the prism-shaped grooves.

In the reflective liquid crystal display device, as the front light described above is used, an image display of uniform brightness can be obtained with a compact and light power supply. Further, by changing the angle of the two sides forming the prism-shaped grooves of the second optical guide plate along with the distance from the point light source or by making shorter the pitch of the prism-shaped grooves, superior display quality, light weight, compact size and high efficiency can be attained.

In the reflective liquid crystal display device of the present invention, the two sides constituting the prism-shape may each form an angle of 30° to 38°, with a flat portion, when viewed two-dimensionally.

By this structure, it becomes possible to improve directivity of the light beam proceeding from the second optical guide plate to the main guide plate, and hence brightness of the image displayed on the reflective liquid crystal display can be improved.

In the reflective liquid crystal display device of the present invention, desirably, an area coated with the reflective film of the second optical guide plate extends exceeding the end portion of the main optical guide plate, when the main optical guide plate and the second optical guide plate are viewed in a direction from the second optical guide plate to the main guide plate.

By this structure, unevenness in brightness is avoided in the image displayed on the liquid crystal display, and uniform brightness can be attained.

The present invention provides a personal digital assistant provided with a reflective liquid crystal display device including a front light, the front light including: a main optical guide plate; a second optical guide plate having its longitudinal direction arranged to extend along widthwise direction of and at an end portion of the main optical guide plate, the second optical guide plate having an end surface facing the main optical guide plate and an opposite end surface, the opposite end surface including a plurality of prism-shaped grooves extending in depth direction, formed along the longitudinal direction; a point light source arranged at an end of the longitudinal direction of the second optical guide plate; and a reflective film coated on a surface of the prism-shaped grooves.

By this structure, it is possible to make compact and light the personal digital assistant such as a mobile phone, or a PDF (Portable Document Format), and in addition, to provide display image having high uniformity and high brightness. In the personal digital assistant, it is desirable that a brightness adjustment volume is provided for adjusting brightness of the displayed image, by controlling power fed to the point light source. By the provision of the brightness adjustment volume dial, it becomes possible to make longer the interval between battery charge by saving power, for example, by reducing power fed to the point light source, that is, LED, where it is bright. Further, desired brightness of the display image can be attained anywhere, including a dark place.

In the personal digital assistant of the present invention, the two sides constituting the prism-shape may each form an angle of 30° to 38° with a flat portion, when viewed two-dimensionally.

By this structure, directivity of the light beam proceeding from the second optical guide plate to the main guide plate can be improved, and the brightness of the display image of the personal digital assistant can be improved.

In the portable digital assistant of the present invention, an area coated with the reflective film of the second optical guide plate extends exceeding the end portion of the main optical guide plate, when the main optical guide plate and the second optical guide plate are viewed in a direction from the second optical guide plate to the main guide plate.

By this structure, unevenness in brightness can be avoided on the displayed image of the personal digital assistant and uniform brightness can be attained.

In the personal digital assistant of the present invention, desirably, the length of the second optical guide plate is at most 100 mm.

This range of the length ensures that the second optical guide plate having the prism-shaped grooves coated with the reflective film attains higher efficiency than the second optical guide plate not having the reflective film coating. Further, this range of the length corresponds to a small size suitable for mounting on portable digital assistance. As a result, a display image with high brightness can be obtained. The length of the second optical guide plate is, more desirably, at most 70 mm and, for higher efficiency, it is desirable to be 50 mm at most.

In the portable digital assistant of the present invention, the width of the second optical guide plate should desirably be at most 10 mm.

By this structure, the display portion effective for displaying information can be enlarged, providing easily viewable image display. The width of the second optical guide plate should desirably be in the range of 2 mm to 7 mm. When the width of the second optical guide plate is smaller than 2 mm, it is difficult to supply light beams of uniform brightness over the widthwise direction of the main optical guide plate. When the width exceeds 7 mm, the area of the display portion for displaying image would be limited. In view of the foregoing, the width of the second optical guide plate is, more desirably, in the range of 3 mm to 6 mm.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 39A to 39C are illustrations representing the front light in accordance with Embodiment 3 of the present invention, in which FIG. 39A represents directions of light beams reflected and directed position by position, when the angle of the groove is changed position by position of the second optical guide plate, FIG. 39B represents a groove at a position away from the center of the second optical guide plate, and FIG. 39C shows a groove at the central position of the second optical guide plate.

FIG. 62A represents propagation of light beams reflected or refracted at the grooves, in the conventional front light using the LED.

FIG. 62B is a cross section representing the groove portion.

FIG. 62C is an illustration representing the angle of the groove.

DESCRIPTION OF THE PREFERRED EMBODIMENTS

Embodiments of the present invention including Reference Examples, will be described with reference to the figures.

Figure 1:
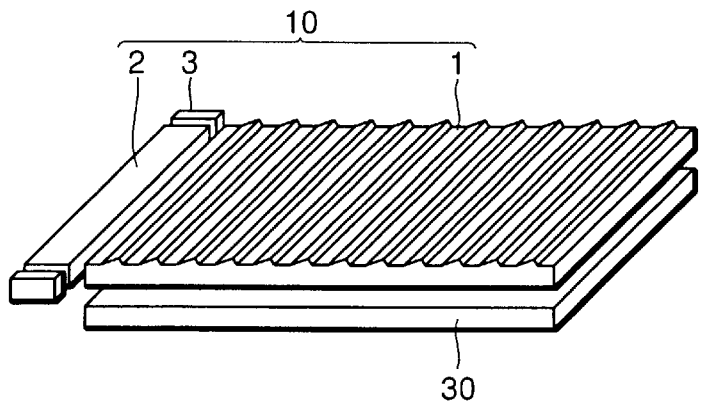
FIG. 1 is a perspective view of the front light in accordance with Reference Example 1.
Figure 2:
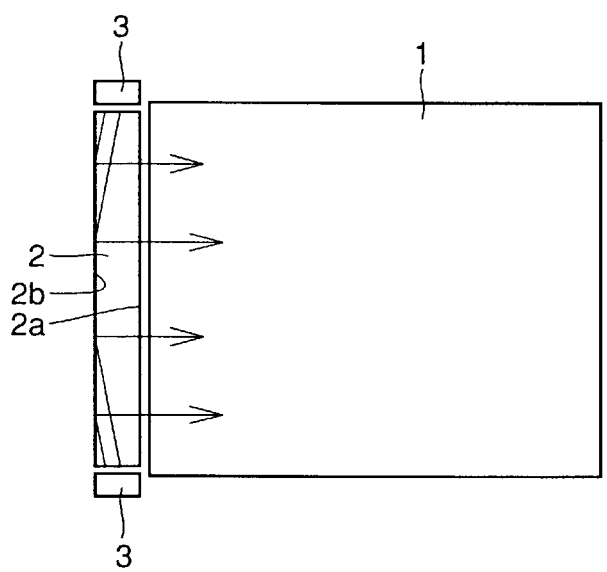
FIG. 2 is an illustration representing illuminating light beams passing through the second optical guide plate of the front light shown in FIG. 1.
Figure 3:
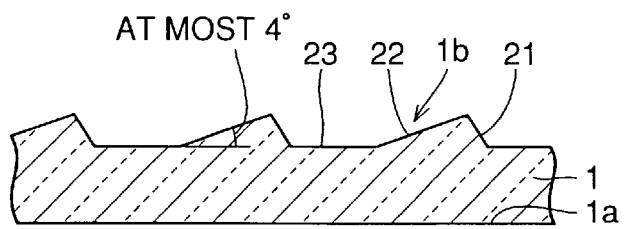
FIG. 3 is an enlarged cross section of the prism-shaped projections of the front light shown in FIG. 1.

Reference Example 1—Angle of the Gentle Slope Surface, Metal Mold for the Projected Portions Arranged Between Flat Portions (1) Overall Structure FIGS. 1 to 8 are illustrations of the front light in accordance with Reference Example 1. The bar shaped light source for the main optical guide plate 1 consists of a second optical guide plate 2 extending in the widthwise direction along an end portion of the main optical guide plate 1, and LEDs 3 as point light sources, arranged at end portions of the second optical guide plate, as shown in FIG. 1. As shown in FIG. 2, light beams emitted from LEDs 3 enter end portions of the second optical guide plate, propagated through the second optical guide plate, and by the light extracting structure formed on the fourth surface 2b of the second optical guide plate, the light beams are emitted from the third surface 2a to the main optical guide plate 1. On the second surface 1b of the main optical guide plate 1, a plurality of projections, each having a prism-shaped cross section, are arranged, extending as ribs along the widthwise direction at equal interval between flat portions. The light beam entering the main optical guide plate 1 reaches the reflective surface 21 of the prism-shaped projection and reflected therefrom, and emitted from the first surface 1a of the main optical guide plate to the display device 30. In the present invention, the reflective surface 21 of the prism-shaped projection forms an angle of about 45° with a flat portion 23, and the other gentle slope surface 22 forms an angle of about 3.5° with the flat portion, as shown in FIG. 3. The light beam that enters the reflective display device and reflected by the reflecting member has been subjected to spatial modulation, and displays an image as it passes from the backside to the front side in the depth direction of the main optical guide plate.

In the main optical guide plate 1, approximately entirely over the second surface, the prism-shaped projections that cause the light beams to be emitted to the display device are provided between flat portions. As can be seen from FIGS. 3 and 4, the reflective surface 21 of the prism-shaped projection reflects the light beam propagated through the main optical guide plate and causes the light beam to be emitted approximately vertically from the main optical guide plate 1, and hence, the reflective surface has an inclination of about 45° with the flat portion. The light beam that is transmitted through the reflective surface 21 having the inclination of about 45° is refracted in a direction much different from the direction to the viewer, and hence the light beam is not recognized by the viewer but lost.

The other inclined surface 22 of the prism-shaped projection has smaller angle of inclination. The light that has entered and reflected from the display device is emitted through both the inclined surface and the flat surface at the second surface of the guide plate. The other gentle slope surface 22 forming the prism at the second surface causes loss of light if the angle formed by this surface and the flat portion is 45° or larger, from the same reason as described above. In that case, optical loss is too large, and hence the displayed image would be dark.

(2) Angle of the Gentle Slope Surface

Figure 4:
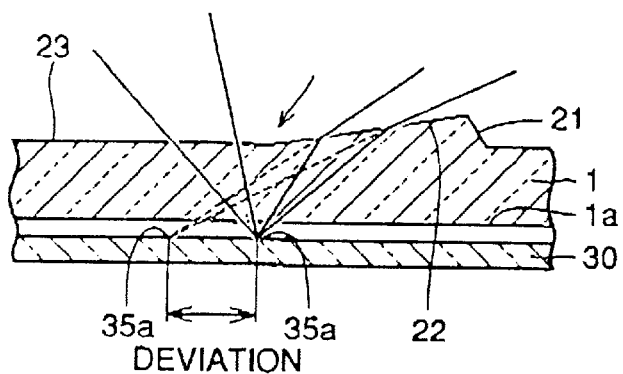
FIG. 4 is an illustration representing the reason why the double image is not visually recognized when inclination angle of the slope other than the reflecting surface is made 4° or smaller, in Reference Example 1.
Figure 5:
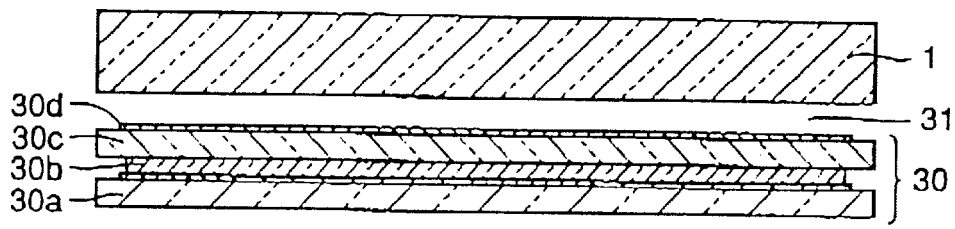
FIG. 5 shows a schematic structure of various members of the LCD in the depth direction.

When the angle of inclination of the gentle slope surface 22 is made smaller to some extent, the beam that has passed through the gentle slope surface 22 would be refracted within an angular range usually recognizable by the viewer, and hence, it is not lost. However, as the beam is refracted at an angle different from the beam that has passed through the flat portion 23 and, further, in the angular range that can be visually recognizable by the viewer, double images result, as shown in FIG. 4. Referring to FIG. 4, the beam that has passed through the flat portion 23 forms an image point 35a, while the beam that has been refracted by the gentle slope surface 22 forms an image point 35b. The distance between the image points 35a and 35b represents the deviation between the double images. By decreasing the angle formed by the gentle slope surface 22 and the flat portion, the angle of refraction becomes smaller, so that image points 35a and 35b come closer to each other, and eventually, deviation between the double images becomes too small to be visually recognizable. The reason why the angle of the gentle slope surface is set to 4° or smaller will be described in detail in the following. In this description, what is important is the distance from the pixels of the display device to the surface of the optical guide plate. Now, an LCD is selected as the display device, and the distance from the pixels to the surface of the optical guide plate will be estimated. The distance is defined by the pixel 30b of liquid crystal/opposing surface 30c/deflection plate 30d/space 31/optical guide plate 1, as shown in FIG. 5. Thickness of each portion is as follows.

(a) Substrate 30c opposing to the lower substrate 30a: 0.5 to 1.0 mm (b) Deflection plate 30d: 0.2 to 0.6 mm (c) Space 31:0.2 mm (d) Optical guide plate 1: 0.5 to 2.0 mm.

Figure 6:
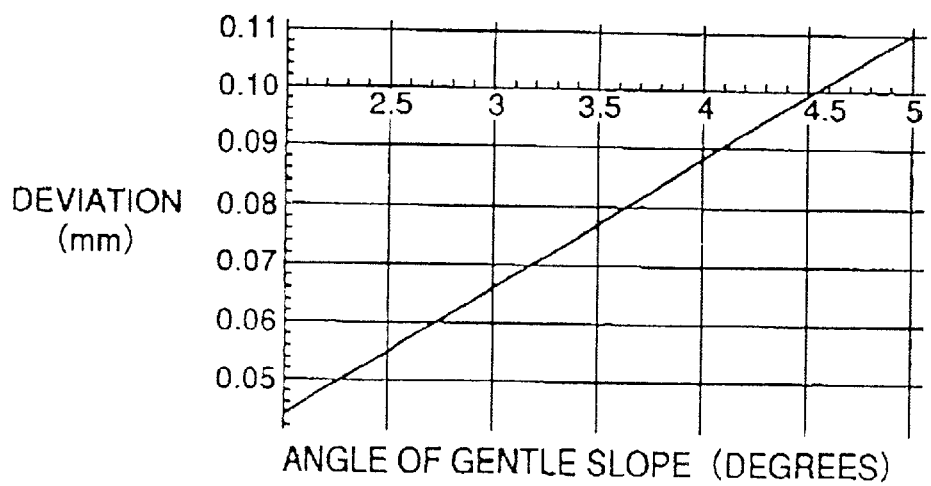
FIG. 6 is a graph representing the relation between the angle of gentle slope surface and radiation.

To be safe, a thickness slightly larger from the central value will be used for calculation. Then, geometrical distance from the pixel to the surface of the optical guide plate is about 3.8 mm, and the optical distance considering the index of refraction of each portion is about 2.5 mm. FIG. 6 represents the relation between the angle of the gentle slope surface and the deviation, when the distance from the pixel to the surface of the optical guide plate is 2.5 mm. When the angle of the gentle slope surface is 5°, the deviation is about 0.11 mm, exceeding 0.1 mm. When one views an image at a distance of 300 mm and the deviation is about 0.1 mm, the interval of deviation would be about 50 cpd, which is not visually recognizable (Hikari Kogaku Handbook, Kabushiki Kaisha Asakura Shoten, Feb. 20, 1986, pp. 144–149). When the angle of the gentle slope surface is set to 4°, the deviation is about 0.09 mm, and it is certainly smaller than 0.1 mm. Therefore, when the angle formed by the gentle slope surface and the flat surface is made 4° or smaller, the deviation can be made visually unrecognizable. Therefore, the double images are not noticed, and hence degradation in the display quality can be prevented.

(3) Effects of the Prism-Shaped Projections Having Flat Portions

Figure 7:
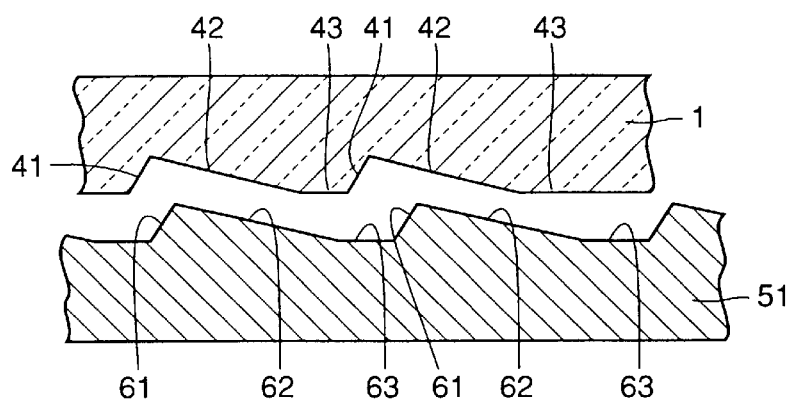
FIG. 7 is a cross sectional view showing a metal mold used when the prism-shaped grooves are to be formed in the main optical guide plate.
Figure 8:
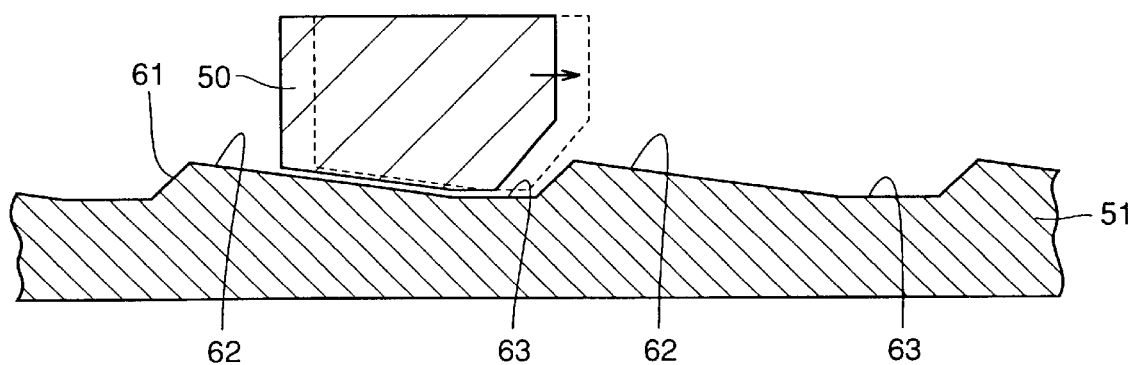
FIG. 8 is a schematic illustration representing processing of the metal mold shown in FIG. 7.
Figure 9:
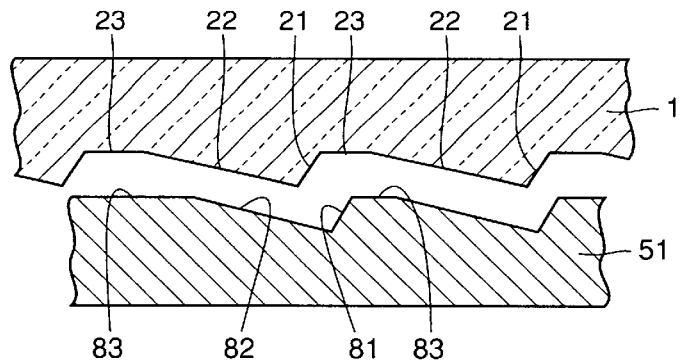
FIG. 9 is a cross section representing a metal mold used when the prism-shaped projections are to be formed in the main optical guide plate.

It is possible to make uniform the light intensity over the entire surface not by projections but by grooves. When grooves are utilized, however, the following problem occurs. Namely, the optical guide plate is fabricated by integral molding, and therefore, it is necessary to fabricate a mold of a reverse shape, as shown in FIG. 7. In manufacturing an integrally molded products, a metal mold takes up a large part, and manufacturing cost of the integrally molded products depends on the difficulty in processing the metal mold. When the optical guide plate 1 have prism-shaped grooves 41 and 42 with flat portions 43, the corresponding metal mold 51 has prism-shaped projections 61 and 62 with flat portions 63 therebetween. Namely, in the metal mold, the flat portions should be carved as grooves. When the flat portions are to be varied, the flat portions as grooves must be carved with different widths. This processing is not easy. As shown in FIG. 8, generally, a metal mold is processed by cutting the metal mold material with a diamond byte. When the width of the flat portions is to be varied, scan processing of the flat portion 63 becomes necessary as shown in FIG. 8. This processing is complicated, the process amount is increased and processing traces resulting from scanning remain. By contrast, if the optical guide plate has prism-shaped projections, the corresponding metal mold 51 have flat portions 83 that are originally processed flat, and prism-shaped grooves 81 and 82 processed by bytes. This processing is simple, and the manufacturing cost for the metal mold is reasonable.

Figure 10:
FIG. 10 is a cross section representing the main optical guide plate of the front light in accordance with Reference Example 2.

Reference Example 2—Effects Attained by Incrementing Height of the Prism-Shaped Projections of the Main Optical Guide Plate In the present reference example, a front light will be described in which the height of the prism-shaped projections of the main optical guide plate is incremented along the depth direction. The structure of the front light in the present reference example other than the main optical guide plate is the same as the front light of Reference Example 1. Referring to FIG. 10, the height of the prism-shaped projections 21, 22 becomes higher at positions deeper from the side where the light beams enter, so that the area of reflective surface per unit length in the depth direction increases. As there is flat portion 23 between the projections, the sides 21 and 22 constituting the prism-shape form the same angle at any prism-shaped projections. Therefore, the metal mold for main optical guide plate 1 shown in FIG. 10 can be readily manufactured, and hence, the main optical guide plate can be manufactured at a low cost. The arrangement of the prism-shaped projections on the second surface of the main optical guide plate 1 is as follows.

| | |
|---|---|
| (S1) Length | 40 mm |
| (S2) Effective area length | 36 mm |
| (S3) Prism pitch | 0.4 mm |
| (S4) Angle of steep slope surface (reflective surface) | 45° |

In this structure, the following four different main optical guide plates are used, and uniformity of light intensity and emission efficiency were compared.

(a) A main optical guide plate in which the height of the prism-shaped projection is made uniform at 20 $\mu$m (b) A main optical guide plate in which the height of the prism-shaped projections is incremented to the deeper side, with the height at the deepest portion increased by 20%

(c) A main optical guide plate of the same type, with the height of the deepest portion increased by 30%

(d) A main optical plate in which the height of the prism-shaped projections is made uniform at 14 $\mu$m.

Figure 11:
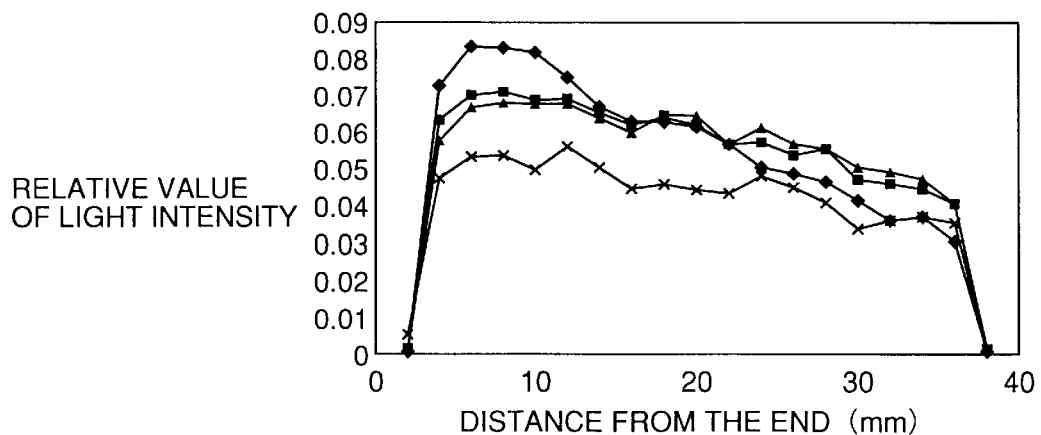
FIG. 11 is a graph representing distribution of emitted light intensity from the main optical guide plate.
Figure 12:
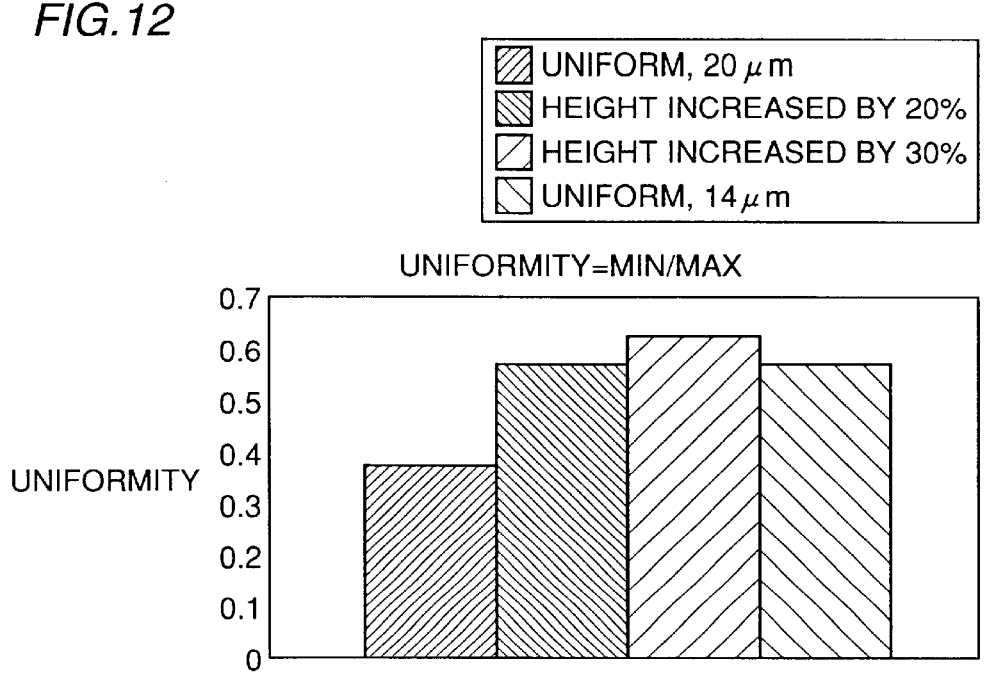
FIG. 12 is a graph representing uniformity of various main guide plates.
Figure 13:
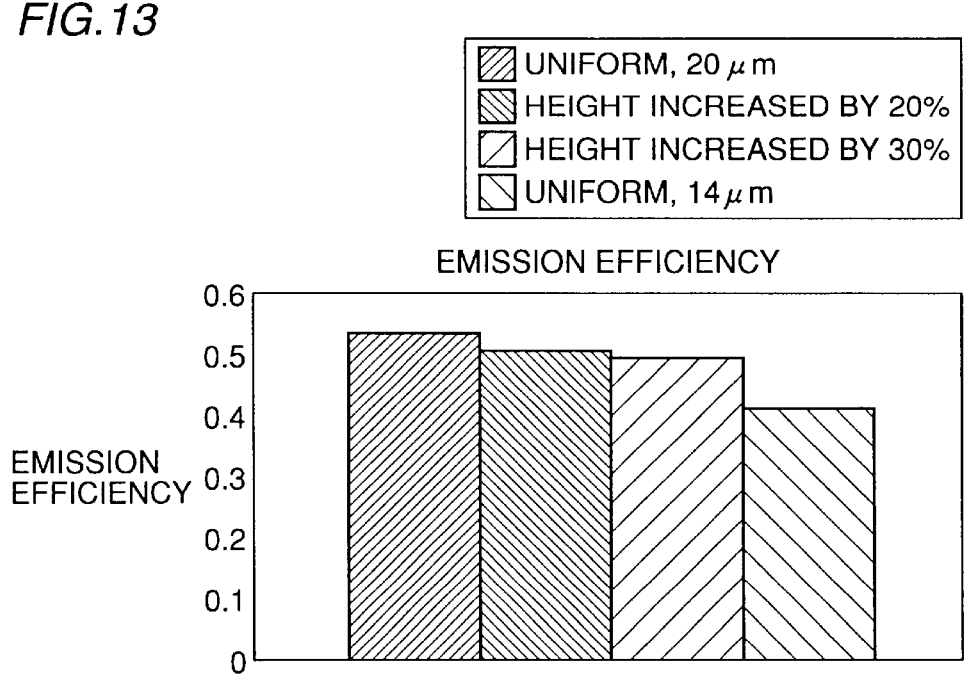
FIG. 13 is a graph representing emission efficiency of various main optical guide plates.

FIG. 11 represents relative value of light intensity at various positions, when the four different main optical guide plates were used. More specifically, (a) when the height is uniform at 20 $\mu$m, a high light intensity is observed at an end portion near the light source, while the light intensity decreases abruptly at a deeper position, and (d) when the height is uniform at 14 $\mu$m, there is no significant variation, while the overall light intensity is weak. Further, (b) when the height of the projection is increased by 20% and (c) when the height of the projection is increased by 30%, light intensity is relatively high, and does not vary significantly position by position. FIGS. 12 and 13 represent the uniformity and emission efficiency of respective main optical guide plates. It is understood that the main optical guide plates having the depths of the projections increased by 20 to 30% along the depth direction is desirable, as the guide plate satisfying both the uniformity and the emission efficiency.

The relation between Reference Examples 1 and 2 will be emphasized in the following, by the summarizing descriptions (P1) to (P3).

(P1) The structure in which the height of the prism-shaped projections of the main optical guide plate is incremented along the depth direction is desirable to improve emission efficiency and uniformity.

(P2) The above described structure, however, can be implemented in an economical manner only when the prism-shaped projections are arranged among flat portions.

(P3) At this time, between the light beam that is refracted and passed through the gentle slope surface and the light beam that passed through the flat portion, deviation between image points result, causing blurred display, degrading display quality significantly. As disclosed in Embodiment 1, the deviation can be made unrecognizable, by setting the angle of the gentle slope surface to be 40 or smaller.

Figure 14:
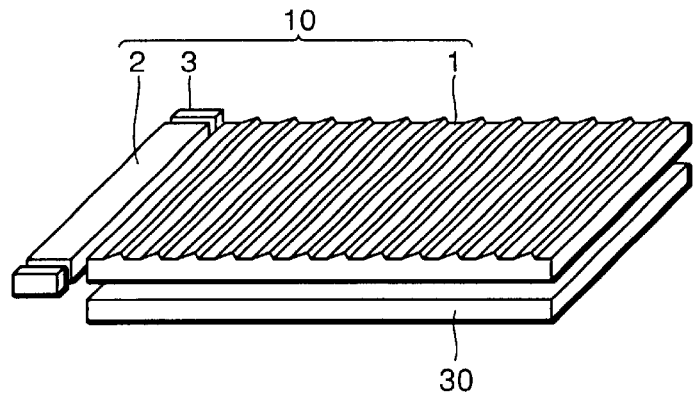
FIG. 14 is a perspective view of the front light in accordance with Reference Example 3.
Figure 15:
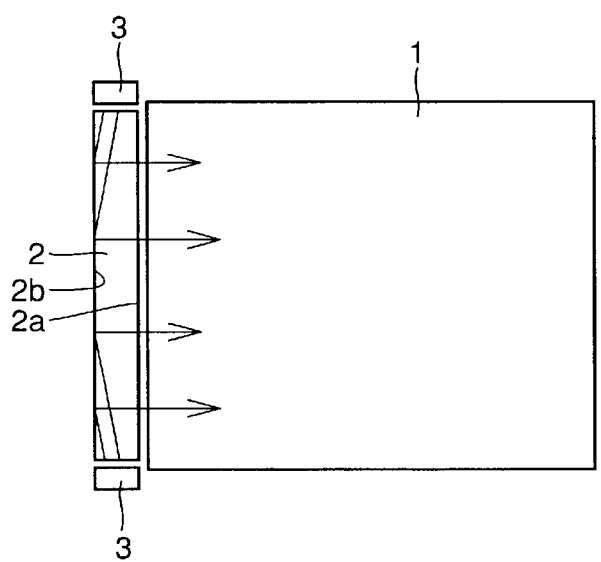
FIG. 15 represents direction of light beam propagation near the light source of the front light shown in FIG. 14.
Figure 16:
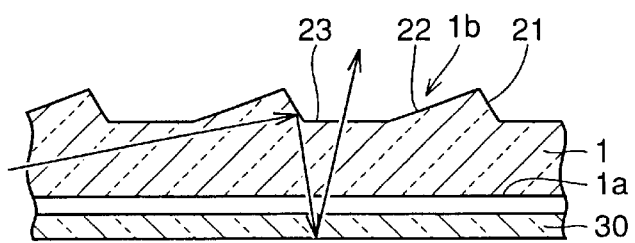
FIG. 16 is an illustration representing the function of the prism-shaped projection, as the light extracting structure of the front light shown in FIG. 14.
Figure 17:
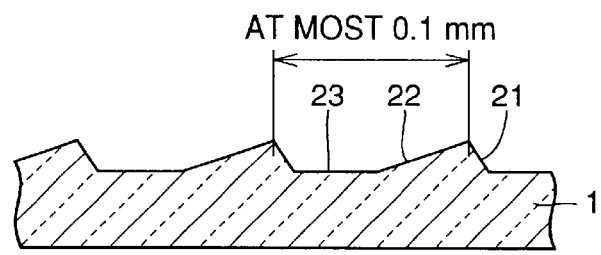
FIG. 17 is an illustration representing the pitch of the prism-shaped projections shown in FIG. 16.

Reference Example 3—Pitch of Prism-Shaped Projections of the Main Optical Guide Plate Referring to FIGS. 14 and 15, a bar-shaped light source is arranged along the widthwise direction of the main optical guide plate, along an end surface of main optical guide plate 1. The bar-shaped light source includes LEDs 3 as point light sources, and a second optical guide plate 2. LED 3 is positioned at an end portion of the second optical guide plate 2 extending in the widthwise direction of main optical guide plate 1. The light beam emitted from LED 3 enters an end portion of the second optical optical guide plate, and propagates through the second optical guide plate in the lengthwise direction. During this propagation, the light beam is reflected by a light extracting structure formed on the fourth surface 2b, which is an end surface opposite the third surface 2a, which in turn is an end surface opposing to the main optical guide plate 1, of the second optical guide plate 2, whereby the beam is emitted from the second optical guide plate to the end surface of the main optical guide plate 1. In main optical guide plate 1, there are a plurality of projections each having a prism-shape cross section, provided at an equal interval and extending as ribs in the widthwise direction, on the second surface 1b, as shown in FIGS. 16 and 17. In the present invention, the pitch between the prism-shaped projections is set to be at most 0.1 mm. The prism-shaped projection is formed by a reflective surface 21, which is a steep slope, and another gentle slope surface 22. On the second surface 1b, there are also flat portions 23. The light beam entering the end portion of the main optical guide plate is reflected by the reflective surface 21 of the prism-shaped projection, whereby the beam is emitted approximately vertically from the main optical guide plate and enters the reflective display device. The beam is reflected by the reflecting member of the reflective display device, and again proceeds to the main optical guide plate. In this course, the beam is spatially modulated, and the reflected light beam displays an image as it passes through the main optical guide plate. When the prism-shaped projections are provided with flat portions, it is possible to change the area ratio of the refractive surface without changing the angle of the prism, and hence, high uniformity can be obtained in a simple manner.

Figure 18:
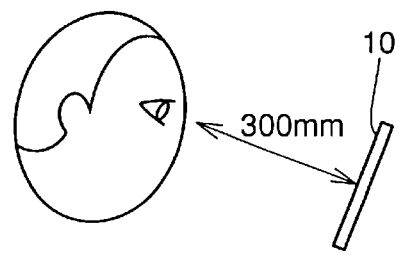
FIG. 18 is an illustration showing a person viewing the reflective display device.
Figure 19:
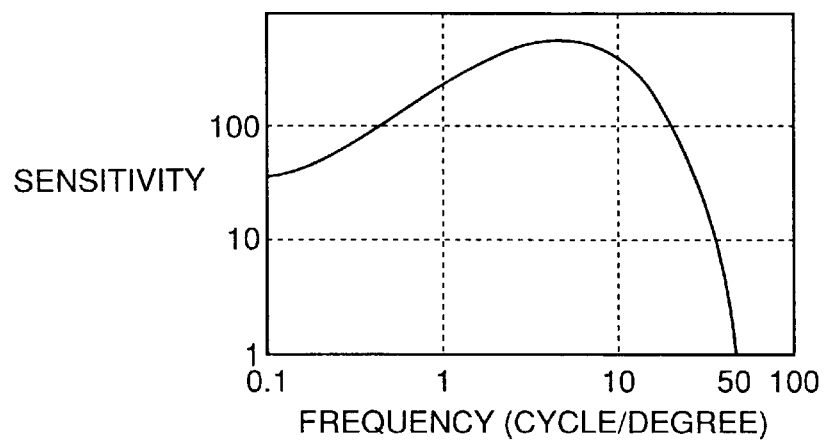
FIG. 19 is a graph representing the relation between the number of fringes (spatial frequency) included in 1° of viewing angle and human visual sensitivity.

In the conventional optical guide plate, the prism-shaped projections have been arranged at wide intervals, approximately entirely over the second surface. Therefore, as already described, when the viewer views the displayed image through optical guide plate 1, the prism-shaped projections are recognized as fringes, hindering display and lowering display quality. When the prism-shaped projections are viewed by human eyes, the fringes having spatial frequency of at most 50 per visual angle of 1° are recognized with relatively high sensitivity, as shown in FIGS. 18 and 19. Visual sensitivity, however, abruptly decreases when the fringes have higher frequencies, that is, fringes have narrower pitches. FIG. 19 is a graph representing the visual sensitivity and spatial frequency (number of fringe-shaped projections included in the visual angle of 1°), when the fringe-shaped projections are viewed by human eyes. Fringes having the spatial frequency of at most 50 per visual angle of 1° are visually recognized with finite sensitivity, while the sensitivity is lost when the frequency exceeds 50, namely, such fringes are visually unrecognizable.

In the display device including the reflective display device, generally, the image screen is used at a distance of about 300 nm. At the distance of 300 nm, the spatial frequency of 50 per visual angle of 1° means the pitch of about 0.105 nm. In the present invention, the prism-shaped projections are formed with a smaller pitch, namely, the pitch of at most 0.1 mm (100 $\mu$m), and therefore fringes of the prism-shaped projections are hardly recognized. Thus, the front light illumination is realized without degrading the display quality.

Embodiment 1—Reflective Groove of the Second Optical Guide Plate

Figure 20A:
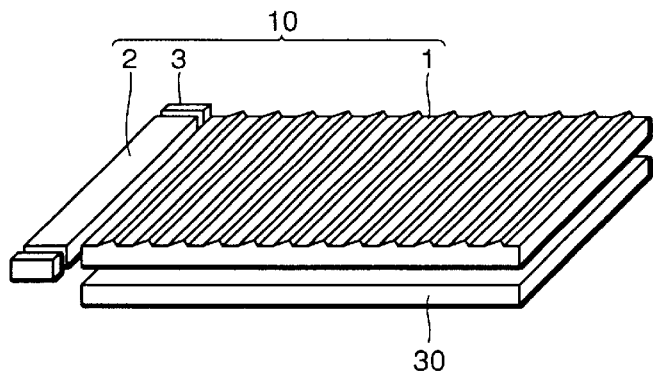
FIG. 20A is a perspective view of the front light in accordance with Embodiment 1 of the present invention.
Figure 20B:
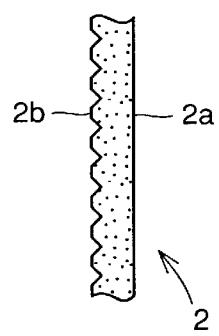
FIG. 20B is a plan view of the second optical guide plate.
Figure 20C:
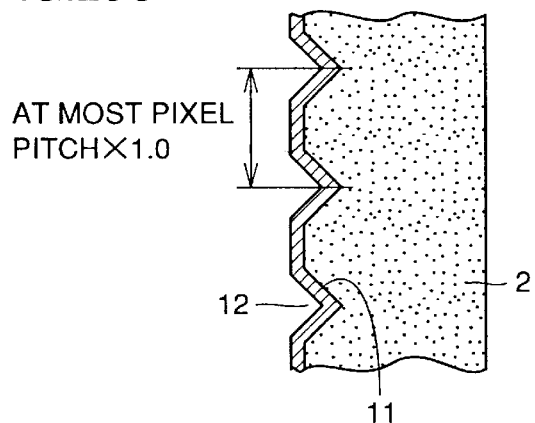
FIG. 20C is a partially enlarged view of the grooves formed on the second optical guide plate.
Figure 20D:
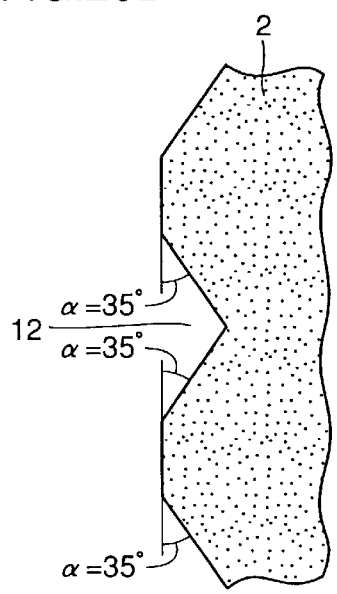
FIG. 20D is an illustration representing the groove angle of $\alpha=35°$.

FIGS. 20A to 20D are illustrations of the front light in accordance with Embodiment 1 of the present invention. FIG. 20A is a perspective view of the front light, FIG. 20B is a plan view of the second optical guide plate 2 arranged along an end surface of the main optical guide plate 1, and FIGS. 20C and 20D show, in enlargement, the prism-shaped groove formed at an end surface 2a opposing to the main optical guide plate of the second optical guide plate 2. As can be seen from FIG. 20D, the angle formed by each of the two sides forming the prism-shape and the flat portion is about 34° (+4°)

(1) Groove Pitch

Referring to FIG. 20A, the light source arranged at an end portion of main optical guide plate 1 includes the second optical guide plate 2 extending in the widthwise direction along the end portion and an LED 3 positioned at an end portion of the second optical guide plate. The light beam emitted from LED 3 enters an end portion of second optical guide plate 2 and propagates through the second optical guide plate, and in this course, it is emitted from the second optical guide plate to the main optical guide plate 1, by the light extracting structure formed on the fourth surface of the second optical guide plate. In the present embodiment, the light extracting structure provided in the second optical guide plate includes prism-shaped grooves 12 having the pitch of 0.15 mm, provided on the fourth surface. The pitch of the prism-shaped grooves 12 has only to be smaller than the pixel pitch of the display device. In the main optical guide plate 1, a number of projections each having the prism-shaped cross section are provided as ribs, at an equal interval on the second surface. The light beam entering the main optical guide plate 1 is directed to the reflective surface 21 of the prism-shaped projection, reflected therefrom, and emitted from the main optical guide plate to the display device 30. The light beam reflected by the reflective display device and returning to the main optical guide plate has been spatially modulated, and displays an image, upon reaching the eyes of the viewer.

Figure 21:
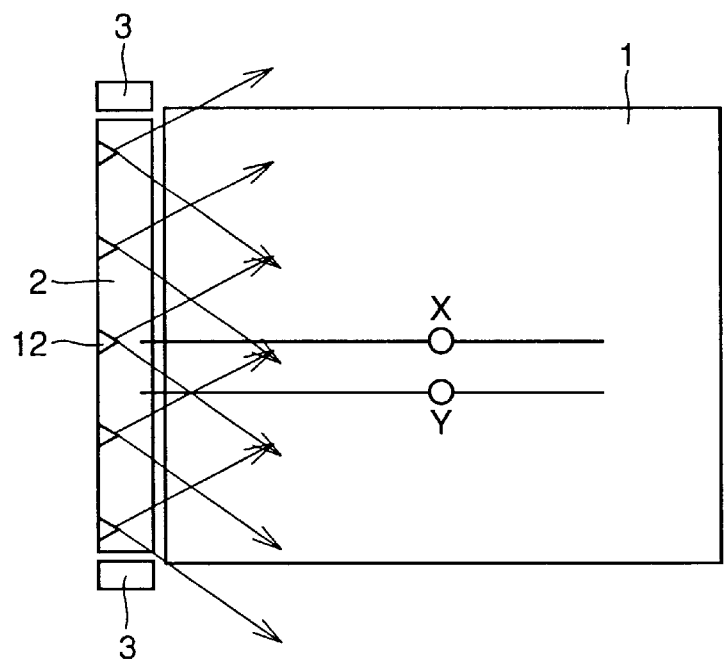
FIG. 21 is an illustration representing generation of uneven illumination when the groove pitch is rough.

In the optical guide plate having the prism-shaped projections as the light extracting structure such as the main optical guide plate 1, the light beam is extracted by the reflection at the reflective surface 21, and there is no influence of scattering effect. Therefore, unless the light entering the end surface of the main optical guide plate 1 is spatially uniform both in intensity and in the direction of progress, uneven illumination results. Namely, there would be uneven illumination as described in the following and shown in FIG. 21.

(X Position): at a position X directly on the lateral side of a bottom point of the second optical guide plate, light beams reflected by the groove and emitted approximately vertically from the end surface of the second optical guide plate are dominant. The light beam emitted approximately vertically from the end surface of the second optical guide plate proceeds in the main guide plate, reflected by the inclined surface of the prism-shaped projection extending along the widthwise direction of the main optical guide plate and approximately vertical to the direction of progress of the light beam, and emitted in the vertical direction, that contributes the most to the front brightness, from the main optical guide plate.

(Y position): at a position Y corresponding to the center between grooves, optical beams reflected by two grooves on both sides of the position Y and emitted obliquely from the end surface of the second optical guide plate are dominant. Such a light beam reaches obliquely to the prism-shaped projection of the main optical guide plate, and therefore, even after reflected from the inclined surface of the projecting portion, the light beam is emitted not vertically from the main optical guide plate, but obliquely as inclined light beam, that does not much contribute to the front brightness.

Figure 22:
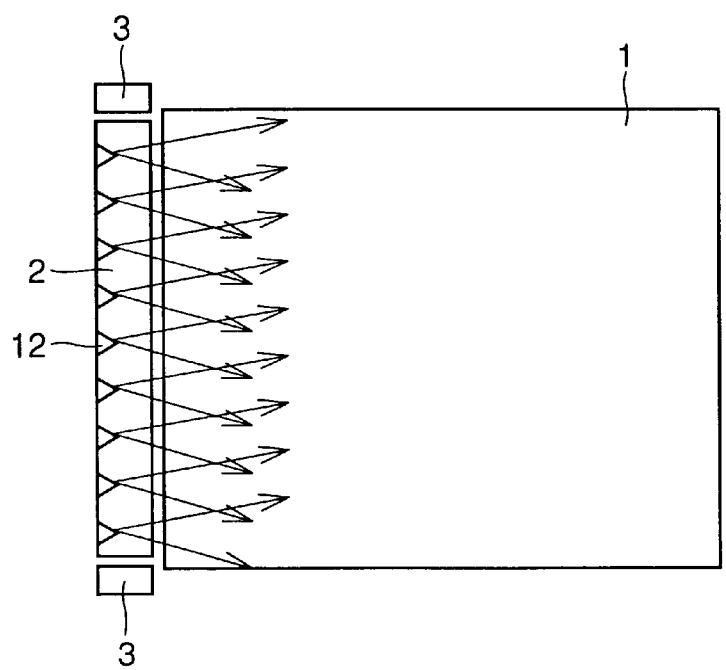
FIG. 22 is an illustration representing illumination light when the pitch between the grooves provided on the second optical guide plate is rough.
Figure 23:
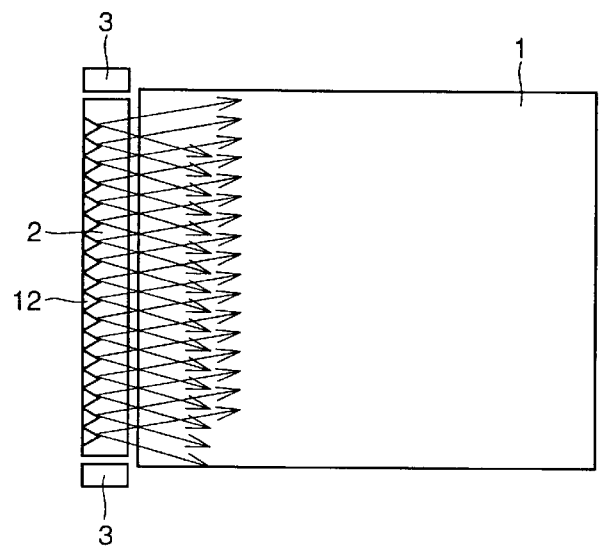
FIG. 23 is an illustration representing expansion of the illumination light, when the pitch of grooves provided in the second optical guide plate is within the range of the present invention.

Therefore, it is darker at the position Y than at the position X, resulting in fringe-like unevenness of brightness. As already described, when the pitch between the grooves is set to be smaller than the pixel pitch of the display device, the unevenness in illumination becomes unrecognizable to human eyes. This phenomenon will be described, comparing examples having a rough groove pitch (FIG. 22) and a fine groove pitch in accordance with the present invention (FIG. 23). Even when the pitch of prism-shaped grooves 12 provided on the first surface 2$b$ of the second optical guide plate 2 is as large as about 1 mm, it is possible to make light intensity almost uniform spatially, as shown in FIG. 22. The light beams entering the main optical guide plate 1 shown in FIG. 22 causes unevenness corresponding to the groove pitch. By contrast, when the pitch of the grooves 12 is made smaller to be at most the pixel pitch of the display device as in the front light in accordance with the present invention, the pitch of the unevenness illumination mentioned above can be made smaller, to be at most the pixel pitch, as shown in FIG. 23. Such unevenness in illumination is unrecognizable to human eyes, and hence the illumination is recognized as uniform. For example, the pixel pitch of a liquid crystal display device is about 300 $\mu$m, and hence the groove pitch should be about 300 $\mu$m (0.3 mm) or smaller. If very high quality of display is desired and even a slight unevenness in illumination should be avoided, the groove pitch should desirably be 200 $\mu$m or smaller.

When the groove pitch is rough and causes uneven illumination, it is possible to eliminate the unevenness in illumination by making light intensity uniform spatially, by means of a scattering member arranged on the side of the third surface, which is the emission surface, of the second optical guide plate.

(2) Reflective Film

On the fourth surface, where the grooves 12 are provided, the second optical guide plate is coated with a reflective film 11. The reason for this is that by the reflective film, the loss of light transmitted through the fourth surface to the outside of the second optical guide plate 2 can be avoided. The reflective film may be adhered on the surface of the grooves, if it is possible that the sheet covers the surface of the grooves in tight contact therewith. A reflector plate, however, is undesirable, as it has high rigidity and tight adhesion on the groove surface is impossible.

(3) Groove Angle $\alpha$

Figure 24A:
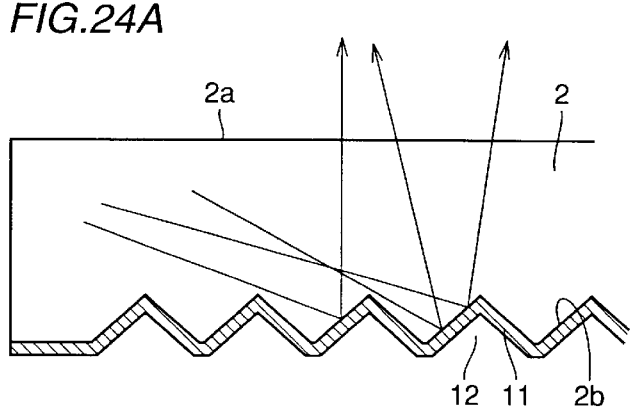
FIG. 24A is an illustration representing the direction of progress of the light beam reflected by the reflective film, when the surfaces of the grooves are coated with the reflective film.
Figure 24B:
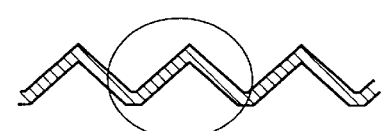
FIG. 24B represents portions of the grooves.
Figure 24C:
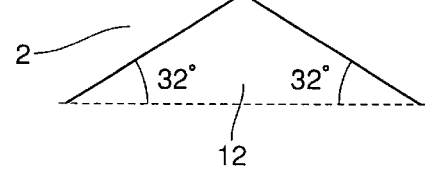
FIG. 24C is an illustration representing the angle of the groove coated by the reflective film.

As described above, when the surface of the groove is covered by the reflective film, it is unnecessary to take in the light that has been refracted at the groove surface and directed to the outside from the surface of the an adjacent groove. Therefore, the angle of the groove of the prism-shape is adapted such that it is as orthogonal as possible to the light emitting surface (fourth surface) of the second optical guide plate. In order that the light beam propagating through the second optical guide plate to be directed to a side of the prism-shaped groove positioned inside, the light beam should be directed to the groove inclined to some extent from the light emitting surface (fourth surface) to the third surface. FIGS. 24A, 24B and 24C are illustrations showing a representative example of the groove angle that efficiently meet the above described objects, when the surface of the groove is covered by a reflective film. As shown in FIG. 24C, in order to attain the above described objects, the groove angle is set to 32°.

Figure 25:
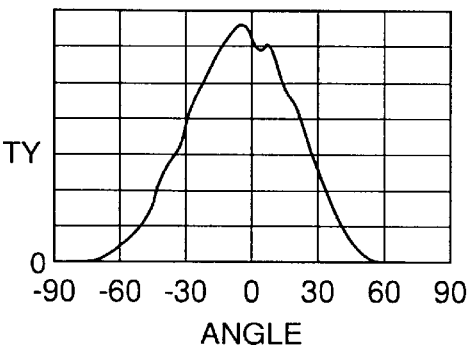
FIG. 25 is a graph representing angular distribution of the emission light when the angle $\alpha$ of the groove is 35°.
Figure 26:
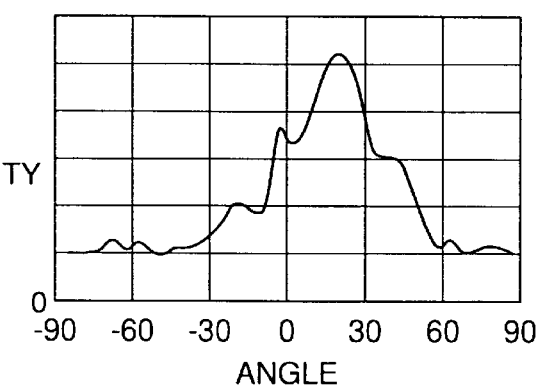
FIG. 26 is a graph representing angular distribution of the emission light when the angle $\alpha$ of the groove is 30°.
Figure 27:
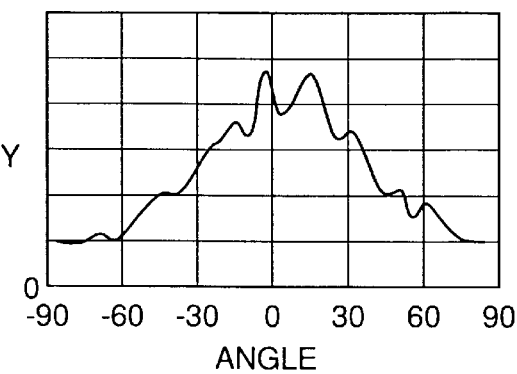
FIG. 27 is a graph representing angular distribution of the emission light when the angle $\alpha$ of the groove is 40°.

FIGS. 25 to 27 are graphs representing angular distribution of light, when the angle $\alpha$ of the groove is changed to 35° (FIG. 25), 30° (FIG. 26) and 40° (FIG. 27), with the pitch of the prism-shaped grooves on the fourth surface of the second optical guide plate being set to a constant value of 0.15 mm. The angle 0° represents a direction parallel to the flat portion of the second optical guide plate, that corresponds to a flat surface where the groove is not provided. When the groove angle $\alpha$ is 35°, the beam is emitted in a direction vertical to the second optical guide plate, and angular distribution expands not very widely, as shown in FIG. 25. When the groove angle $\alpha$ is 30°, emission is not vertical, and the width at an end portion is relatively wide for the width of the peak, as shown in FIG. 26. When the groove angle $\alpha$ is 40° (FIG. 27), though vertical emission is attained, the width is too large to effectively provide light beams contributing to the front brightness. When the groove angle $\alpha$ is 30°, the brightness is not so much lowered as in the example having the groove angle $\alpha$ of 40°. Therefore, the groove angle $\alpha$ should be in the range of 30° to 38°. In view of ease in processing, the prism-shaped grooves are often made to have the same angle. However, the grooves need not have the same angle. With the angle $\alpha$ within this range, uniform illumination with high front brightness is attained.

Further, in order to obtain display of which brightness is highly uniform, a scattering member may be arranged on the side of the light emitting surface of the second optical guide plate.

Reference Example 4—Position of the Corner of the Main Optical Guide Plate

Figure 28:
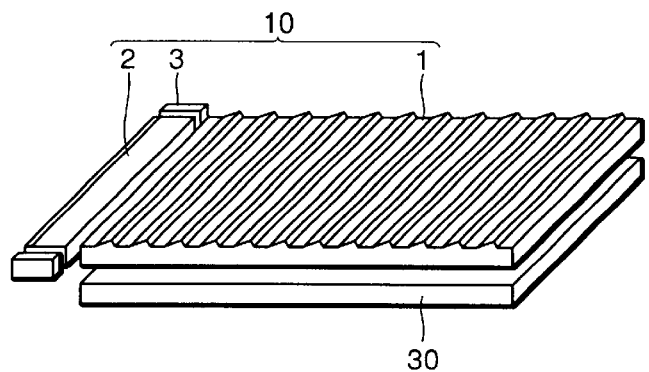
FIG. 28 is a perspective view of the front light in accordance with Reference Example 4.
Figure 29:
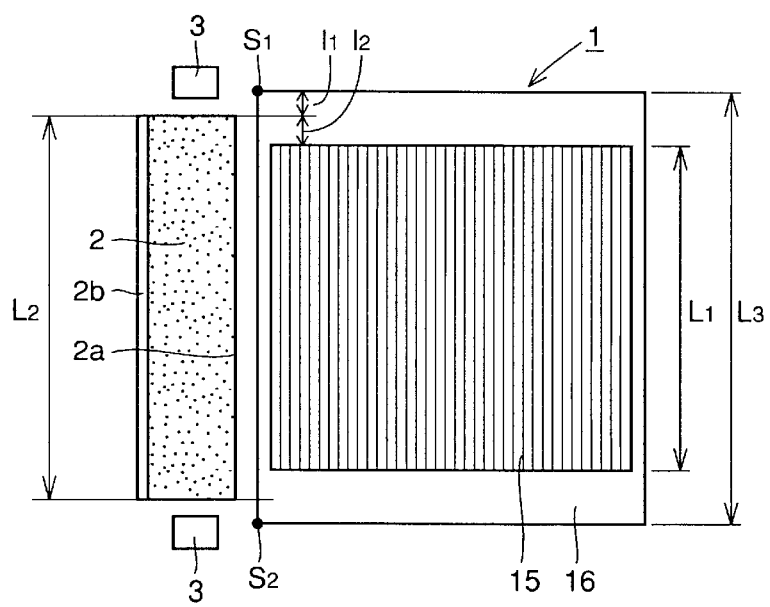
FIG. 29 is a plan view showing the front light of FIG. 27.
Figure 30:
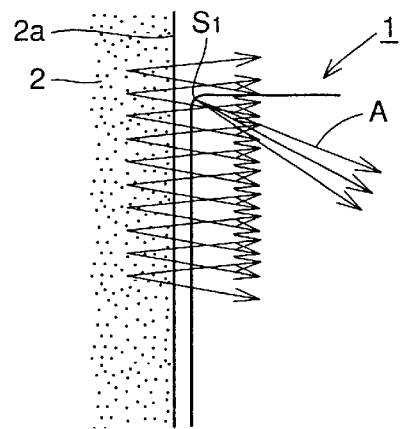
FIG. 30 is a partially enlarged view of the corner of the conventional main optical guide plate.

In FIGS. 28 and 29, the light source arranged along an end portion of the main optical guide plate 1 includes a second optical guide plate 2 extending in the widthwise direction of main optical guide plate 1 and LEDs 3 positioned at opposing ends thereof. On the fourth surface 2$b$ of the second optical guide plate, grooves as the light extracting structure shown in Embodiment 1 are provided, emitting light beams to the main optical guide plate 1. The function attained by the prism-shaped projections as the light extracting structure in the main optical guide plate 1 is the same as in the front lights in accordance with Reference Examples 1 to 3 and Embodiment 1.

Figure 31:
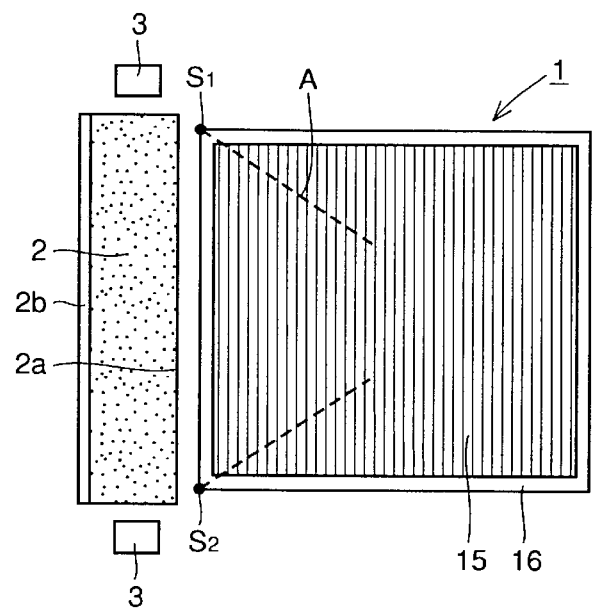
FIG. 31 is an illustration representing emission lines or dark lines generated when the light beam entering from the second optical guide plate to the main optical guide plate passes through the corner of the main optical guide plate.

When the structure shown in FIG. 31 is adapted, the light beam emitted from the second optical guide plate 2 passes through the corners S1 and S2 of main optical guide plate 1 and enters the main optical guide plate 1. In this case, the light beam is refracted at the corner locally in an angle different from that at other portions of the optical guide plate, and thus uniformity in the direction of progress of the light beam is lost. As a result, a strong emission line A or a dark line may be generated from the corner.

In the present reference example, referring to FIG. 29, the length L2 of the second optical guide plate is made smaller than the width L3 of main optical guide plate 1, and the corners S1 and S2 of optical guide plate 1 are positioned outside the widthwise range of the optical light beams directed from the second optical guide plate to the main optical guide plate. Further, the width L1 of an area 15 of main optical guide plate 1, where the prism-shaped projections as the light extracting structure are formed on the second surface, is shorter than the length L2 of the second optical guide plate, so that the area is within the widthwise range of the optical beams directed from the second optical guide plate to the optical guide plate 1. The width L3 of main optical guide plate 1 is the sum of the width of the area 15 where the prism-shaped projections are formed and the width of the area 16 not having the projections. In view of reduction in size and weight, the area at the periphery of the display area is limited and cannot be made very large. Therefore, in FIG. 29, l1 and l2 are each at most 2.0 mm. Further, in order to ensure such light intensity of the light beam refracted at the bent corner that does not produce visually recognizable emission line or dark line, l1 is set to be at least 0.2 mm. Further, if it is of higher priority to save area other than the effective display area, l1 and l2 should be at most 1.0 mm. When prevention of the emission line or the dark line is of higher priority, l1 should be at least 0.3 mm.

By the structure of this reference example, the light beam emitted from the second optical guide plate does not pass through the corners S1 and S2 of the optical guide plate. Thus, emission light or dark light generated from the corner can be prevented. Further, the width of the area 15 provided with the prism-shaped projections on the second surface 1b of the main optical guide plate is encompassed within the width of the optical beams emitted from the second optical guide plate 2, and therefore, the area requiring illumination surely receives sufficient light. By this structure, a front light can be provided, which is free of any emission line or dark line at the corner and which provides sufficient illumination to the entire display area.

Figure 32:
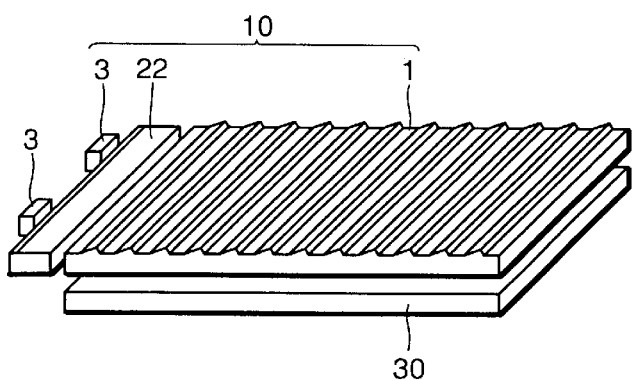
FIG. 32 is a perspective view of the front light in accordance with Reference Example 5.
Figure 33:
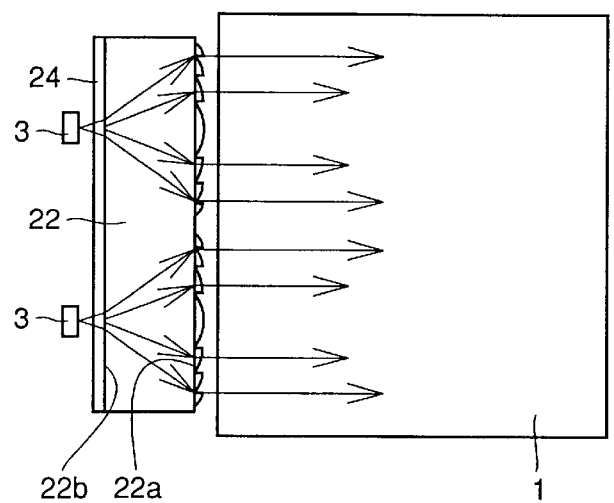
FIG. 33 is a plan view illustrating the front light of FIG. 31.

Reference Example 5—Combined Use of a Point Light Source, a Scattering Layer and a Fresnel Lens Referring to FIGS. 32 and 33, the light source arranged along an end portion of main optical guide plate 1 includes the following members: the second optical guide plate 22; a Fresnel lens 23 provided on the third surface 22a, that is, an end surface facing the optical guide plate 1 of the second optical guide plate; a scattering layer 24 provided on the fourth surface 22b, which is an end surface opposite to the optical guide plate 1, of the second optical guide plate; and an LED 3 arranged on the side of the fourth surface. The light extracting structure of the main optical guide plate 1 is the same as in the front lights of Reference Examples 1 to 4 and Embodiment 1. In the main optical guide plate 1 having the prism-shaped projections, light is extracted by regular reflection at the reflective surface (not shown) and the optical beams are not influenced by the scattering effect. Therefore, unless the light beams entering the main optical guide plate 1 are uniform both in the intensity and incidence angle spatially, uneven illumination results.

Referring to FIG. 33, a light beam emitted from LED 3 as the point light source passes through scattering layer 24 and enters the second optical guide plate 22. As the light beam has been passed through scattering layer 24, the light beam is diffused widely in the second optical guide plate, so that intensity is made uniform to a prescribed level, regardless of the position. Further, Fresnel lens 23 is arranged on the third surface 22a of second optical guide plate 22. Therefore, by the Fresnel lens structure having the point of light-incidence as a focal point, the light beams diffused from the incidence point have their directions changed to be parallel beams, by the effect of the Fresnel lens, and directed to the main optical guide plate 1. On the third surface 22a of the second optical guide plate, Fresnel lens 23 should be arranged same in number as the number of point light sources. As the light beams having the directions of progress aligned by the Fresnel lens and intensity made spatially uniform enter the main optical guide plate 1, a front light can be provided that attains high quality of display with high front brightness and without unevenness in illumination.

When the scattering layer or a concave lens surface diffusing light beams is arranged on the fourth surface 22b as the entering side of the second optical guide plate 22, light intensity can be made almost uniform spatially. The direction of progress, however, is not uniform. By positioning a Fresnel lens 23 on the light emitting surface 22a of second optical guide plate 22, the direction of progress of the light beams entering the main optical plate can be aligned for the first time. Therefore, light beams uniform both in the intensity and the direction of progress enter the main optical guide plate 1, whereby illumination of high quality, that is, uniform and having high front brightness, is possible.

Figure 34:
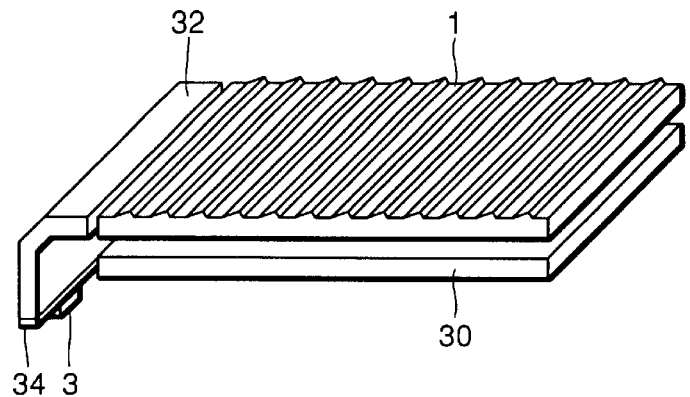
FIG. 34 is a perspective view of the front light in accordance with Reference Example 6.
Figure 35:
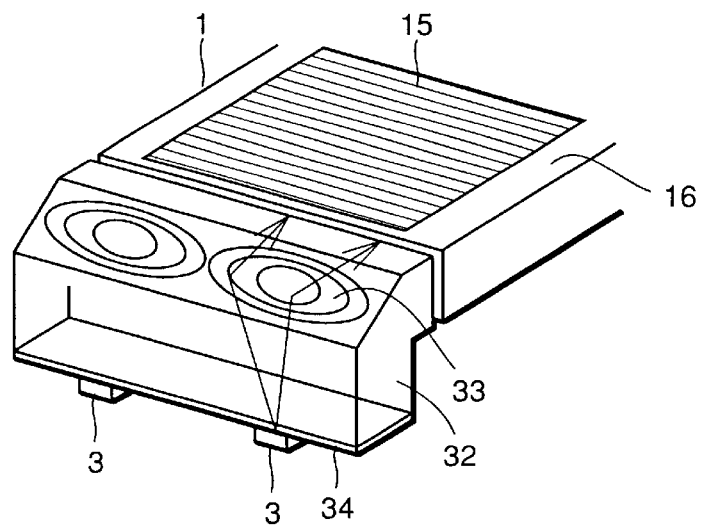
FIG. 35 is a perspective view of the second optical guide plate of the front light shown in FIG. 33.

Reference Example 6—Use of a Point Light Source, a Scattering Layer and a Reflective Fresnel Lens (Bent Structure Referring to FIGS. 34 and 35, the light source arranged along an end surface of main optical guide plate 1 includes a second optical guide plate 32 bending the direction of progress of the light beams by 90°, a scattering layer 34, a reflective Fresnel lens 33 and a light source 3. The light beam emitted from LED3 as the point light source passes through the scattering layer 34, and propagated through the second optical guide plate while diffused widely, so that the light intensity is made uniform spatially. As shown in FIG. 35, the light beams have the directions aligned when reflected by the reflective Fresnel lens 33 positioned on the reflective surface that bends the light beams by about 90° in the second optical guide plate, and the beams are emitted to optical guide plate 1. The reflective surface mentioned above is attached to the second optical guide plate at an angle of inclination by about 45° with respect to the direction of progress of the light beams. The reflective Fresnel lens 33 mentioned above has a Fresnel lens structure, having the incident point as a focal point. Namely, the Fresnel lens 33 is capable of aligning the directions of the diffused light beams to provide a flux of parallel light beams. The state of light beams in the main optical guide plate 1, after the light beams having the intensity and the direction of progress made uniform are introduced to the main optical guide plate 1, is the same as in Reference Examples 1 to 5 and in Embodiment 1.

When a scattering layer is formed or a concave lens diffusing light beams is arranged at the surface to which light enters from the light source to the second optical guide plate 32, the intensity of light beams can be made uniform. The direction of progress, however, is not uniform. By providing the reflective Fresnel lens at the reflecting portion in the second optical guide plate, it becomes possible to align the direction of progress at the reflecting portion. Thus, light beams uniform both in the intensity and the direction of progress can be supplied to the optical guide plate 1. Thus, the illumination having high display quality of uniform and high front brightness can be attained.

Reference Example 7—Main Optical Guide Plate Having Two-Layered Structure

Figure 36:
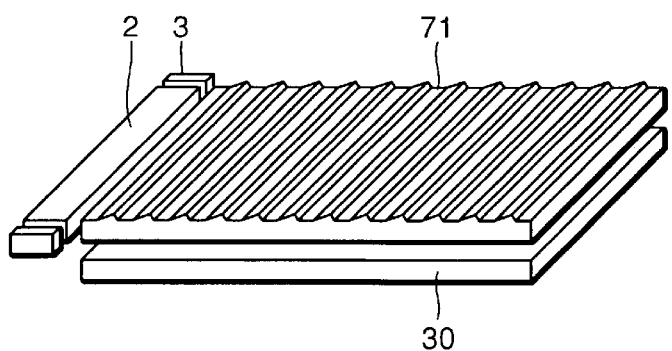
FIG. 36 is a perspective view of the front light in accordance with Reference Example 7.
Figure 37:
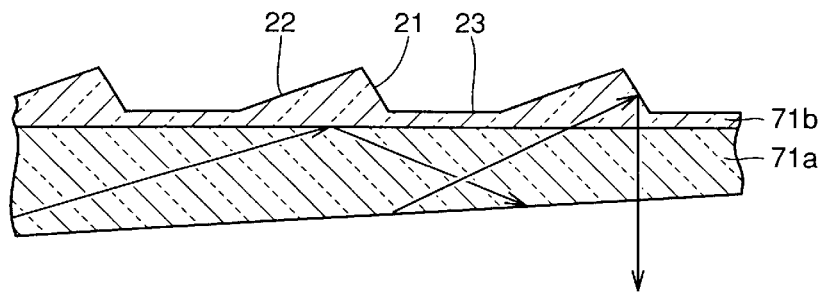
FIG. 37 is a cross section representing the function of the main optical guide plate of the front light shown in FIG. 35.

Referring to FIGS. 36 and 37, in the present reference example, a main optical guide plate 71 has a two-layered structure including a surface layer 71a having the first surface facing the display device, and a main layer 71b having the second surface opposite to the first surface. The main layer is much thicker than the surface layer, and the thickness of optical guide plate 1 is, in most part, the thickness of the main layer. The light source arranged along an end surface of main optical guide plate 71 includes the second optical guide plate 2 and LEDs 3 positioned at opposing ends of the second optical guide plate. The light beam emitted from the LED and propagating through the second optical guide plate is emitted from the second optical guide plate by means of the light extracting structure provided on the fourth surface of the second optical guide plate 2, and enters the main optical guide plate 71. In the main optical guide plate 71, the light beam is reflected at the reflective surface of the prism-shaped projection provided at the side of the surface layer having lower index of refraction than the main layer, and emitted to the display device. The light beam propagating through the main layer 71a of the main optical guide plate 71 is, basically, regularly reflected at the interface between the main layer and the surface layer having low index of refraction. Therefore, in approximation, it is possible to consider that the light propagating through main optical guide plate 71 propagates through the main layer 71a. Only the light beam that propagates through the main optical guide plate 71 at a large angle that does not satisfy the regular reflection condition at the interface propagates through the surface layer, that is, propagates through the prism-shaped projections of the layer having low index of refraction. The light beam propagating through the surface layer 71b is reflected by the reflective surface 21 of the prism-shaped projection, and taken out of the optical guide plate 71. By selecting the index of refraction of the surface layer, which is the layer of low index of refraction, in an appropriate range, it becomes possible to limit the angular range of the light beams that leak to the layer of low index of refraction, to be sufficiently small. Thus, the angular range of the direction of progress of the extracted light beams can be limited to a small range. For example, when the index of refraction of the surface layer is set to 1.38 and the index of refraction is set to 1.5, it is possible to have light beams emitted to the display device aligned in the range of a few to 10° along the direction of progress, with the light beam almost vertical to the surface of the main optical guide being the center. Therefore, optical loss and the light beams not contributing to the surface brightness can be almost eliminated, and light beams contributing to the front brightness can be provided. Thus, illumination having very high brightness at the front side can be provided.

Embodiment 2—Length of the Second Optical Guide Plate

Figure 38:
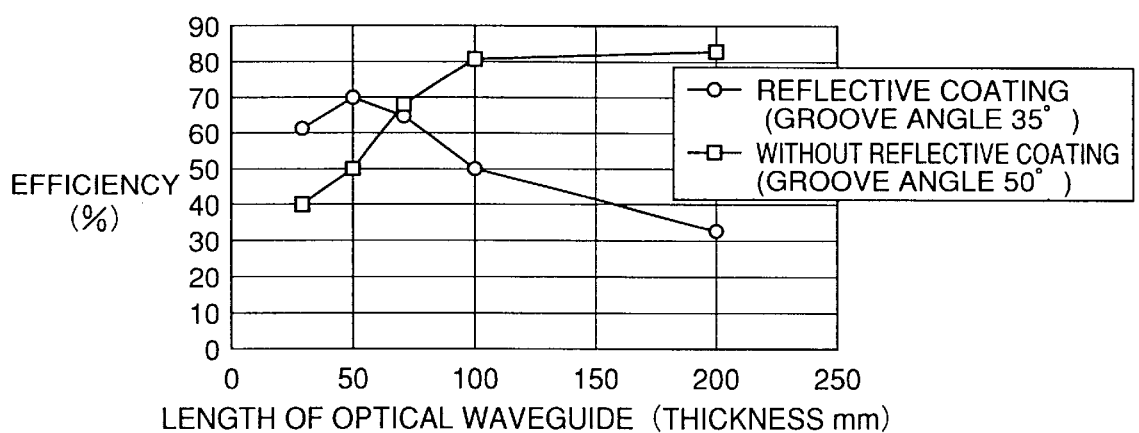
FIG. 38 is a graph related to the front light in accordance with Embodiment 2 of the present invention.

Referring to FIG. 38, the second optical guide plate having the surface of the prism-shaped grooves covered by a reflective film suffers from a loss of 10% or higher, by the reflection at the reflective film. Therefore, when the second optical waveguide becomes longer, the efficiency becomes lower than that of the second optical waveguide not covered by the reflective film. Referring to FIG. 38, the length at which the efficiency of the second optical guide plate covered with the reflective film is superior (threshold length) is about 70 mm to at most 100 mm. The threshold length depends on the width of the second optical guide plate, and therefore, the length of about 70 mm to 100 mm mentioned above cannot always be considered correct. However, the length of this range may be used as a reference. For example, for a liquid crystal display device of a portable digital assistant such as a mobile phone, provision of the front light having such a second optical guide plate that has the surface of the prism-shaped grooves covered by the reflective film attains high efficiency, and thus provides display image of high brightness.

Embodiment 3—Angular Distribution of Grooves of the Second Optical Guide Plate

Figure 39:
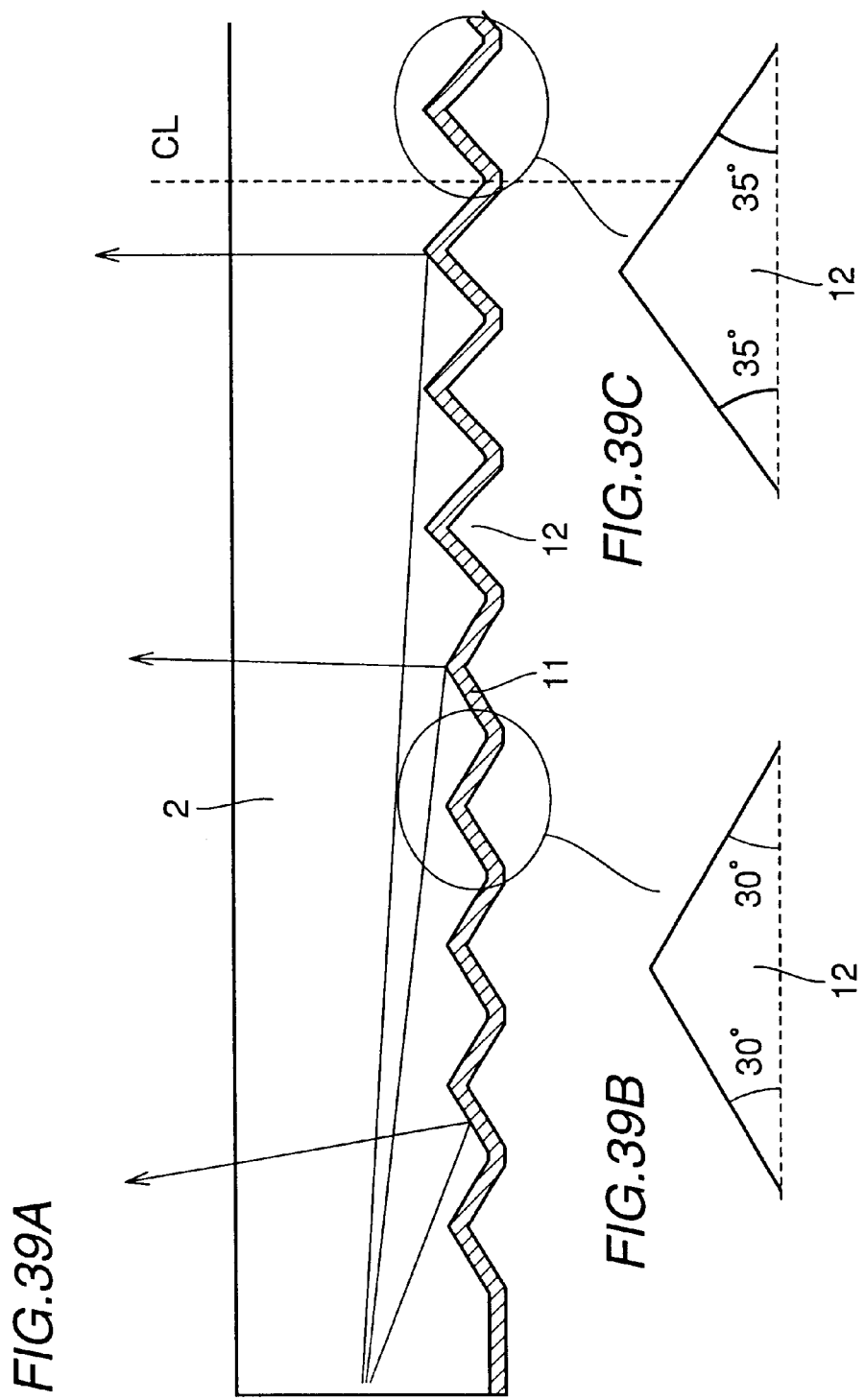
Figure 40:
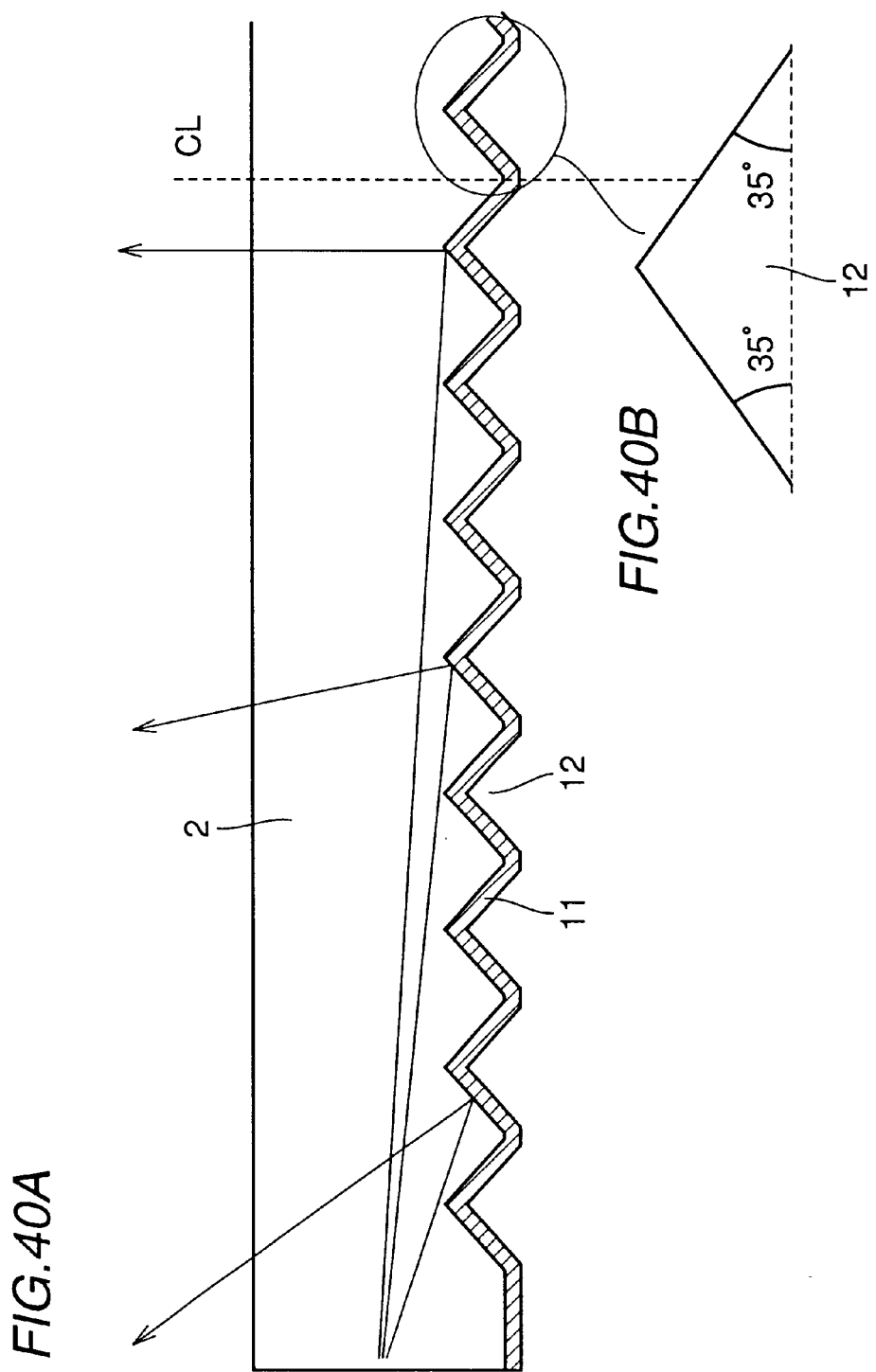
FIGS. 40A and 40B are illustrations when the grooves are formed to have the same angle (shape) at any position of the second optical guide plate.
Figure 41:
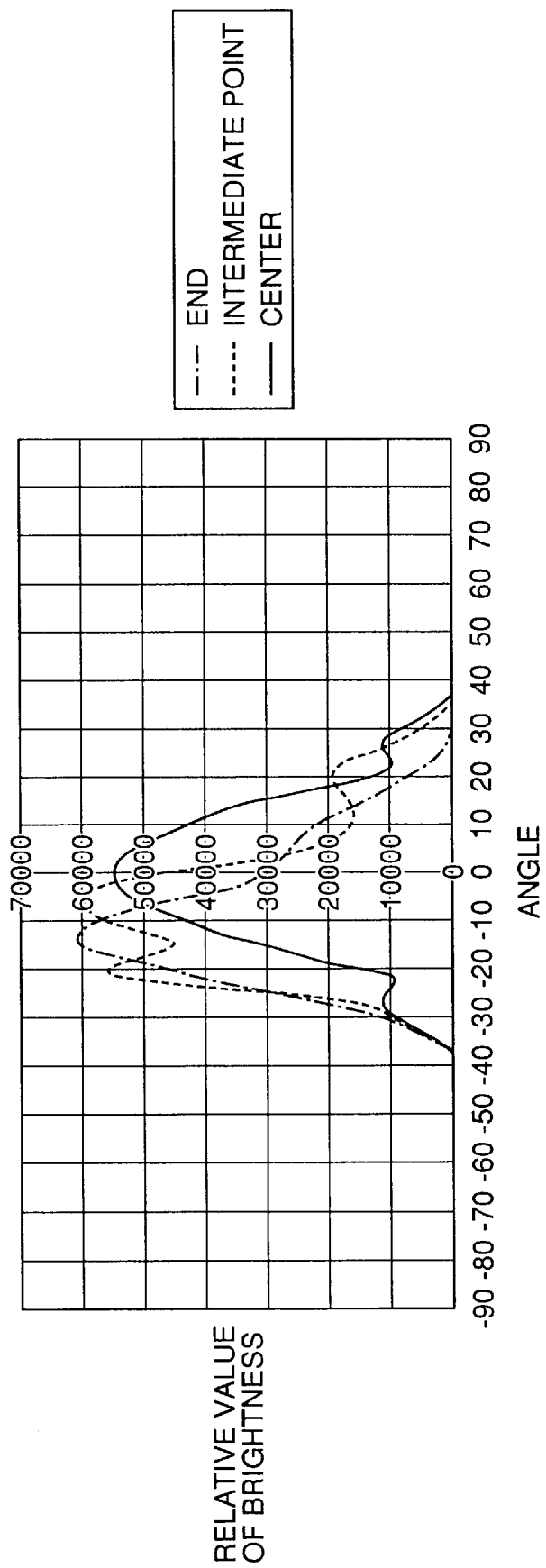
FIG. 41 is a graph representing relative value of brightness in the direction of reflection, at the central portion, at an end portion and a position immediately between the end and the center, when the angle of the groove is made constant at 35°.

Referring to FIG. 39, in the front light, the angle formed by each side of the groove with the flat portion is as large as about 35° near the center CL along the length of the second optical guide plate, as can be seen from FIG. 39C, and the angle is made smaller to about 30° at a portion near the end. More specifically, the angles formed by the sides of the prism-shaped grooves and the flat lines vary position by position of the second optical guide plate. The reason why the angle that is made smaller near the end of the second optical guide plate is advantageous is as follows. FIGS. 40A and 40B represent directions of reflection of the light beams from the grooves, when the angles of the prism-shaped grooves are made constant at 35°, at the fourth surface of the second optical guide plate. Referring to 40A, near the center CL along the length direction of the second optical guide plate, the light beam emitted from the groove proceeds approximately vertical to the light emitting surface. By contrast, the light beam emitted at a groove near an end closer to the LED proceeds in a direction inclined toward the light beam before emission. FIG. 41 shows the result of measurement of the inclination of the light beams reflected at the grooves, measured at three points, that is, the center, the end, and an intermediate position between the center and the end, along the lengthwise direction of the second optical guide plate. It can be seen from FIG. 41 that light beams reflected at the end and reflected at a middle point between the end and the center proceed to directions inclined by about 10° to 15° from the direction vertical to the light emitting surface. The reflection angle varying dependent on the position of the second optical guide plate may cause unevenness in brightness.

When the above described angle is made smaller at an end portion near the LED and made larger near the center in the range of 30° to 38° as shown in FIGS. 39A to 39C, the light beams come to proceed in the direction orthogonal to the light emitting surface and directions near the orthogonal direction, no matter at which groove the light beams are reflected. Thus, the display image of high brightness without unevenness can be attained, entirely over the lengthwise direction of the second optical guide plate.

Embodiment 4—Formation of Reflective Film

Figure 42:
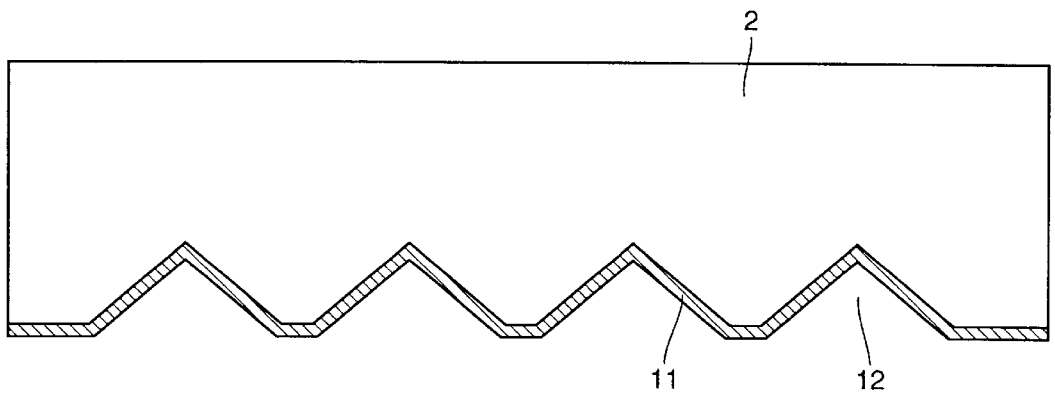
FIG. 42 is an illustration of the front light in accordance with Embodiment 4 of the present invention.
Figure 43:
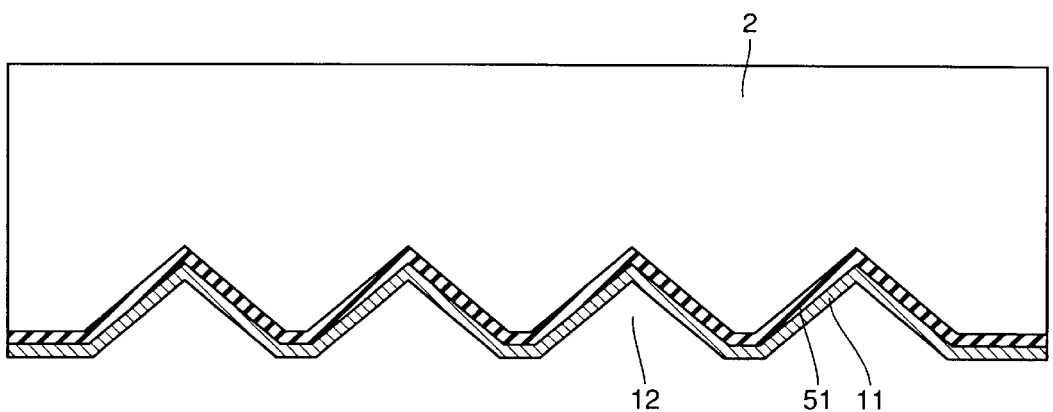
FIG. 43 represents a front light in accordance with the present invention, in which a reflective film is formed by providing an underlying film below the metal film shown in FIG. 42.

Referring to FIG. 42, on the surface of the prism-shaped grooves of the front light, a metal film 11 is provided. Aluminum, silver, copper, gold, platinum or the like may be used for the metal film, and the film may be formed by vapor deposition, sputtering or the like. Similar to the main optical guide plate, the second optical guide plate is formed of a transparent resin. Therefore, adhesion of the metal film to the surface of the resin may be unsatisfactory. One possible means to prevent poor adhesion is to perform roughening process, such as blasting, on the surface of the grooves, as already described. Because of the surface roughness formed by the roughening process, adhesion of the metal film to the resin surface can significantly be improved. Another possible means is to form an underlying film 51 such as an $SiO_2$ film, on the surface of the second optical guide plate, and forming the metal film 11 by vapor deposition or sputtering on the underlying film 51, as shown in FIG. 43. By the coating of such two-layered structure, a reflective film superior in adhesion and durability can be obtained. Further, as the interface between the underlying film and the metal film can be kept in a state very flat and free of impurity, increase in reflectivity is expected.

Figure 44:
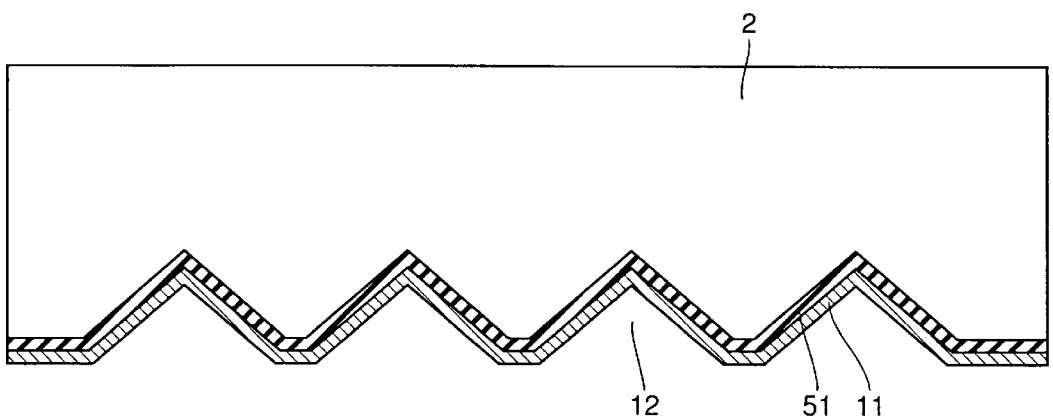
FIG. 44 is an illustration representing the front light having the second optical guide plate provided with the reflection enhancing film, in accordance with a modification of Embodiment 4 of the present invention.
Figure 45:
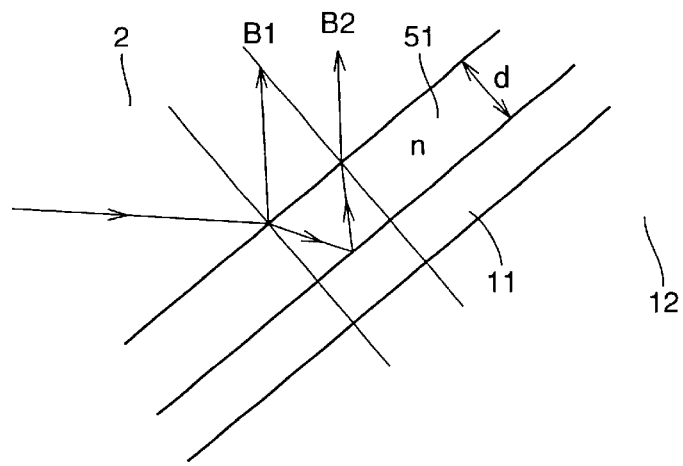
FIG. 45 is an illustration related to the reflection enhancing film of FIG. 44.

FIGS. 44 and 45 represent a modification of the present embodiment, in which a multi-layered reflectivity enhancing film utilizing the effect of interference is formed by controlling the index of refraction n and the thickness t of the underlying film. In this modification, the index of refraction n and the thickness t of underlying film 51 are so controlled that reflected beams B1 and B2 shown in FIG. 45 reinforce each other. By the use of such of reflective film, the efficiency can further be improved, and a display image of higher brightness is obtained.

Figure 46:
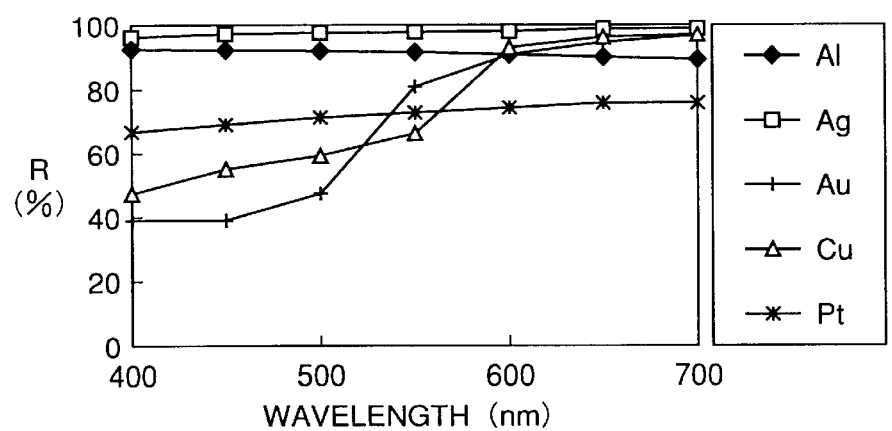
FIG. 46 is a graph representing wavelength dependency of the reflectivity of the metal film.

The material of the metal film may be selected considering the reflectivity shown in FIG. 46. Silver has the highest and aluminum has the second highest reflectivity. Both silver and aluminum exhibit constant high reflectivity, regardless of the wavelength of the light beam. When a film covering a resin is to be formed, a silver film is inferior to aluminum film in view of durability, though silver film has higher reflectivity. Accordingly, generally, an aluminum film is used.

When an LED is used as the light source, it is often the case that the spectrum of the emitted light has higher intensity on the blue side, that is, on the shorter wavelength side. Therefore, in order to emit light beams of uniform intensity distribution, gold or copper having low reflectivity on the shorter wavelength side and higher reflectivity at the longer wavelength side may be used. The reason why the spectrum of the light beam emitted from the LED has higher intensity on the blue side is that the white light is commonly provided by wavelength-converting blue LED by a fluorescent body.

Figure 47:
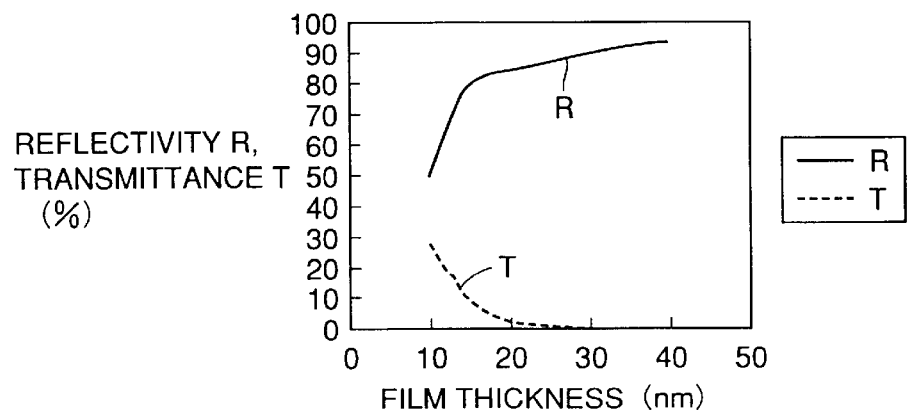
FIG. 47 is a graph representing the relation between the thickness of an aluminum metal film and reflectivity or transmittance.

FIG. 47 is a graph showing the relation between the reflectivity R or transmittance T and the thickness of the aluminum film used as the reflective film. Referring to FIG. 47, it can be understood that sufficient reflectivity can be attained when the aluminum film has the thickness of at least 50 nm.

Figure 48:
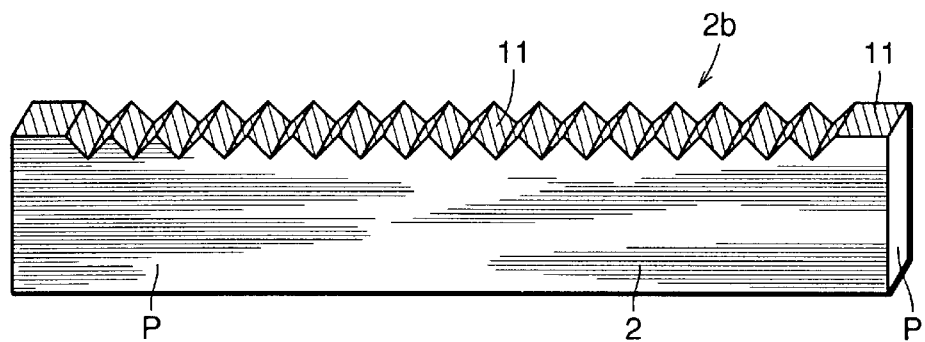
FIG. 48 shows a reflective film forming surface.

The metal film is formed on the fourth surface on which the grooves are formed of the second optical guide plate, and in order to prevent lower efficiency, extension of the films over the end surface or upper or lower surfaces or adhesion on such surfaces must be avoided. More specifically, metal film 11 should not be formed on the surfaces P including end surfaces and upper and lower surfaces, not even to a small extent, other than the fourth surface, as shown in FIG. 48. In order to prevent adhesion or over-extension of the metal film to the outside of the fourth surface, the method of forming a metal film such as shown in FIG. 49 may be utilized.

Figure 49:
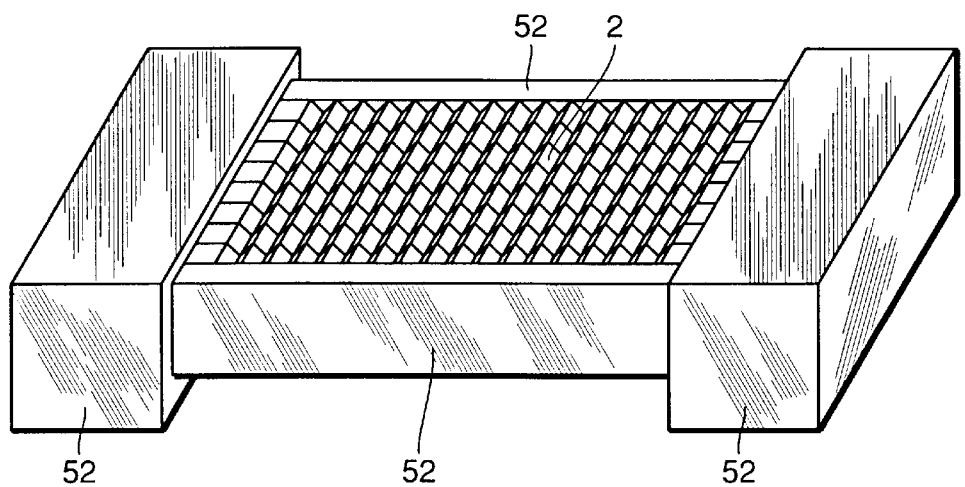
FIG. 49 is an illustration representing the method of forming the reflective film.

Referring to FIG. 49, the second optical guide plates each formed by metal mold in advance are placed side by side in contact with each other, so that only the areas to which the metal film is to be adhered are exposed, and remaining portions are concealed by each of the second optical guide plates as well as by the stop jigs 52. By mounting the set of second optical guide plates held by the stop jigs in this manner in a vapor deposition apparatus or a sputtering apparatus, the metal film can be vapor-deposited efficiently on the target portions. In the method of forming the metal film shown in FIG. 49, the manufacturing steps of forming each of the second optical guide plates by metal molds→forming the set using the stop jigs→forming the metal film, have been described. Alternatively, the metal film may be formed only on the target area of a semi-processed block corresponding to a plurality of the second optical guide plates, and thereafter, the semi-processed block may be divided to produce a number of second optical guide plates. Though the second optical guide plates shown in FIG. 49 are manufactured using metal plates, the optical guide plates may be manufactured by machine processing, or by the combination of machine processing, polishing and etching, provided that there is no scratch or damage to the surface.

By the above described manufacturing method, the second optical guide plate having prism-shaped grooves can be formed with high efficiency and high production yield.

Embodiment 5—Range of Reflective Film

Figure 50:
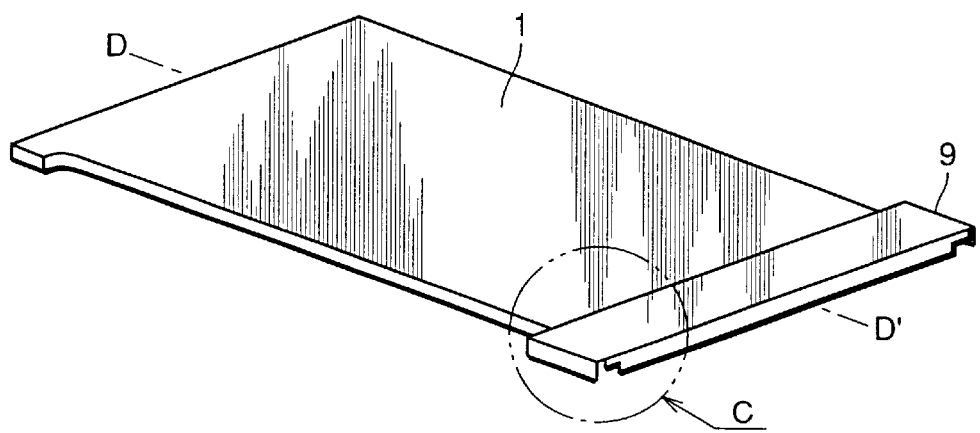
FIG. 50 is an illustration of the front light in accordance with Embodiment 5 of the present invention.
Figure 51:
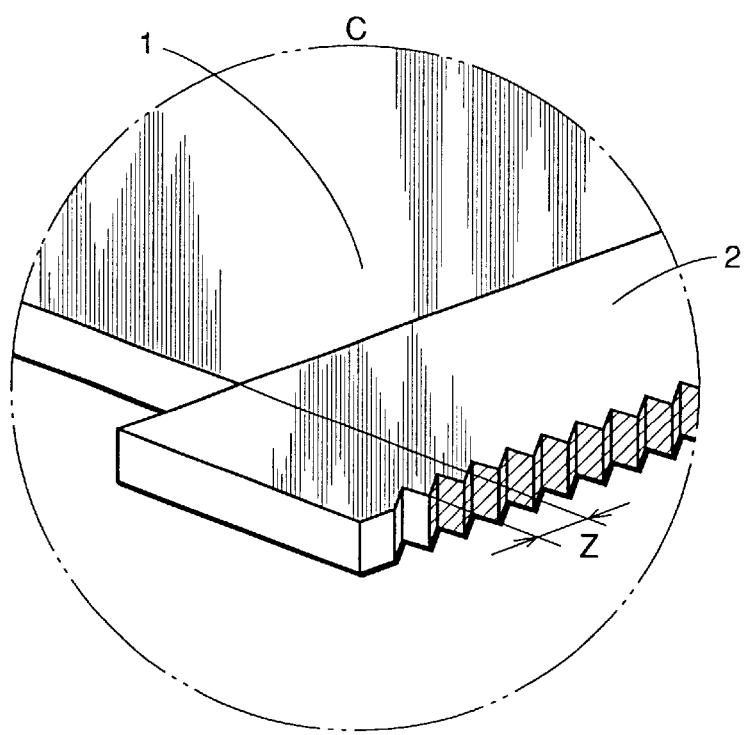
FIG. 51 is an enlarged view of the portion C of FIG. 50.
Figure 52:
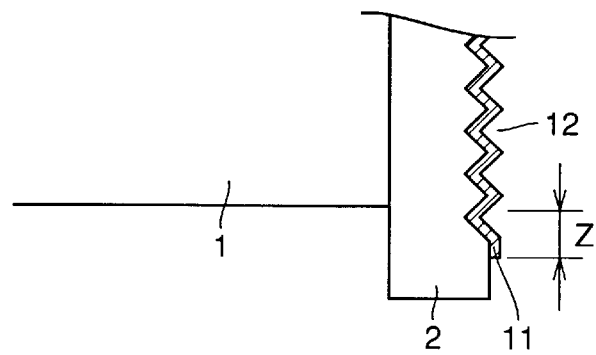
FIG. 52 is a plan view of the portion C of FIG. 50.

FIG. 50 shows the main optical guide plate 1 and the second optical guide plate (not shown) having relative positions fixed by a reflector 9. FIG. 51 is a perspective view of the reflector, showing, in enlargement, the portion C of FIG. 50. FIG. 52 is a plan view of the same portion. In the present embodiment, as shown in FIGS. 51 and 52, the range of the area covered by the reflective film of the fourth surface having grooves of the second optical guide plate must be wider than the end surface of a main optical guide plate. More specifically, the distance Z shown in FIGS. 51 and 52 should be larger than zero. When the range covered by the reflective film is narrower than the end surface of the main optical guide plate, border lines between dark and light appear undesirably on the liquid crystal display image. In order to avoid such border lines, the range covered by the reflective film is made larger than the end surface of the main optical guide plate, as shown in FIGS. 51 and 52.

Figure 53:
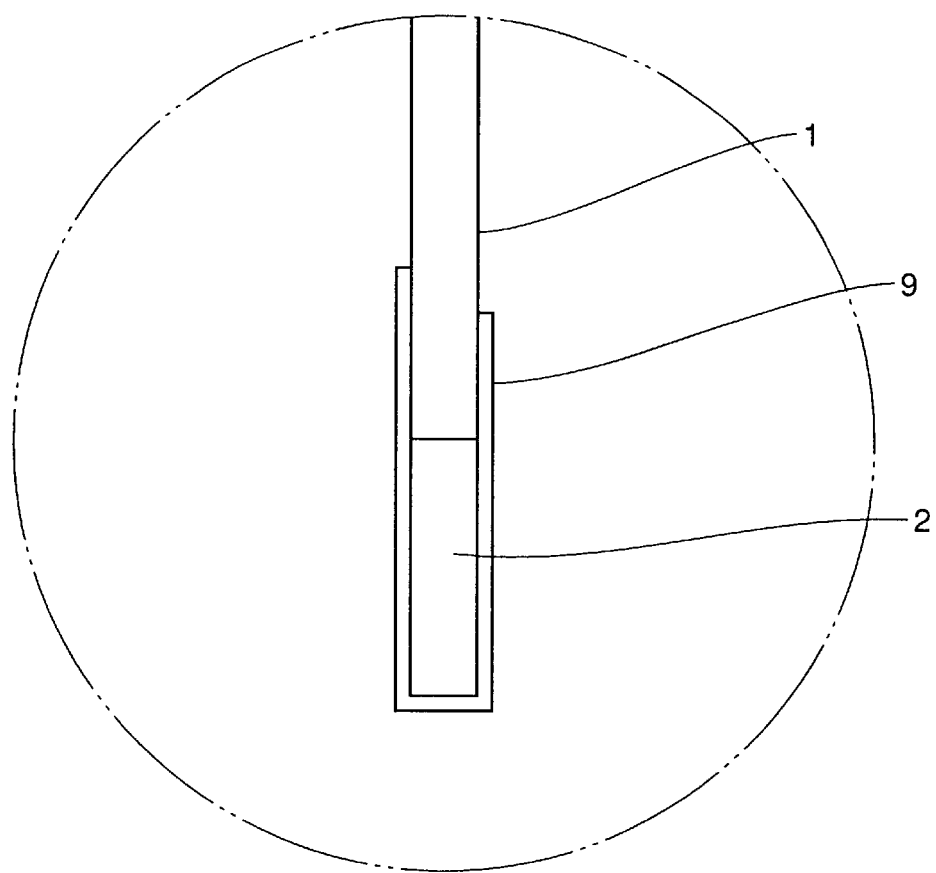
FIG. 53 is a cross section taken along the line D–D' of FIG. 50.

In the present embodiment, a reflector 9 is used. Reflector 9 is arranged as shown in FIG. 53 that is a cross section taken along the line D–D' of FIG. 50. The reflector is used to prevent loss of light and to integrate mechanically the second optical guide plate and the main optical guide plate. When the surface of the grooves of the second optical guide plate is not covered by the reflective film, it is a common practice to cover the inner surface of the reflector 9 entirely with a silver coat. When the surface of the grooves of the second optical guide plate is covered by the reflective film as described above, the efficiency can be improved by the reflective film, and hence, silver coat on the inner surface of the reflector can be eliminated. When integration between the main optical guide plate and the second optical guide plate is realized by other means, the reflector itself can be eliminated.

Figure 54:
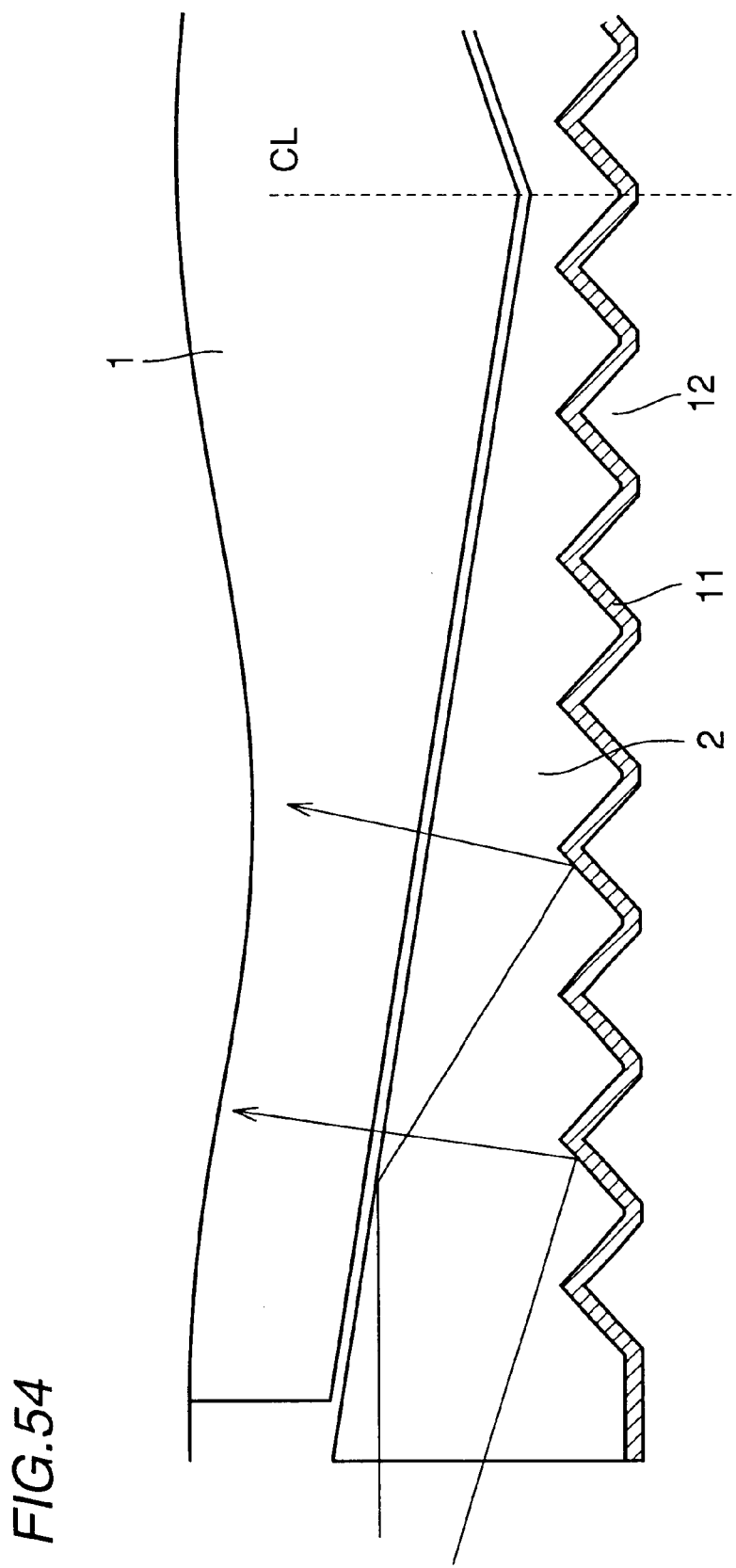
FIG. 54 is a cross section representing the second optical guide plate and the main optical guide plate of the front light in accordance with Embodiment 6 of the present invention.

Embodiment 6—Modification of the Second Optical Guide Plate and the Main Optical Guide Plate Referring to FIG. 54, the main optical guide plate 1 in accordance with Embodiment 6 has an end surface tapered such that the center CL is protruded most to the side of the second optical guide plate. The second optical guide plate is also tapered such that the central portion is recessed most, conforming to the tapered shape of the main optical guide plate.

Of the light beam entering from the point light source to the second optical guide plate, the light beam reaching the tapered end surface of the second optical guide plate is regularly reflected, and directed to the prism-shaped groove covered with the reflective film position on the opposite end surface, reflected there and directed to the main optical guide plate. The light beam not reflected at the tapered end surface of the second optical guide plate but refracted and emitted is partially reflected at a surface of the tapered end of the main optical guide plate, and thus reflected light beam again enters the second optical guide plate, directed to the prism-shaped groove, reflected there and directed to the main optical guide plate. Thus, the light beams emitted from the point light source can be directed to the prism-shaped reflective grooves covered with the reflective film of the second optical guide plate with high efficiency. Thus, the efficiency can further be improved.

Embodiment 7—Personal Digital Assistant

Figure 55:
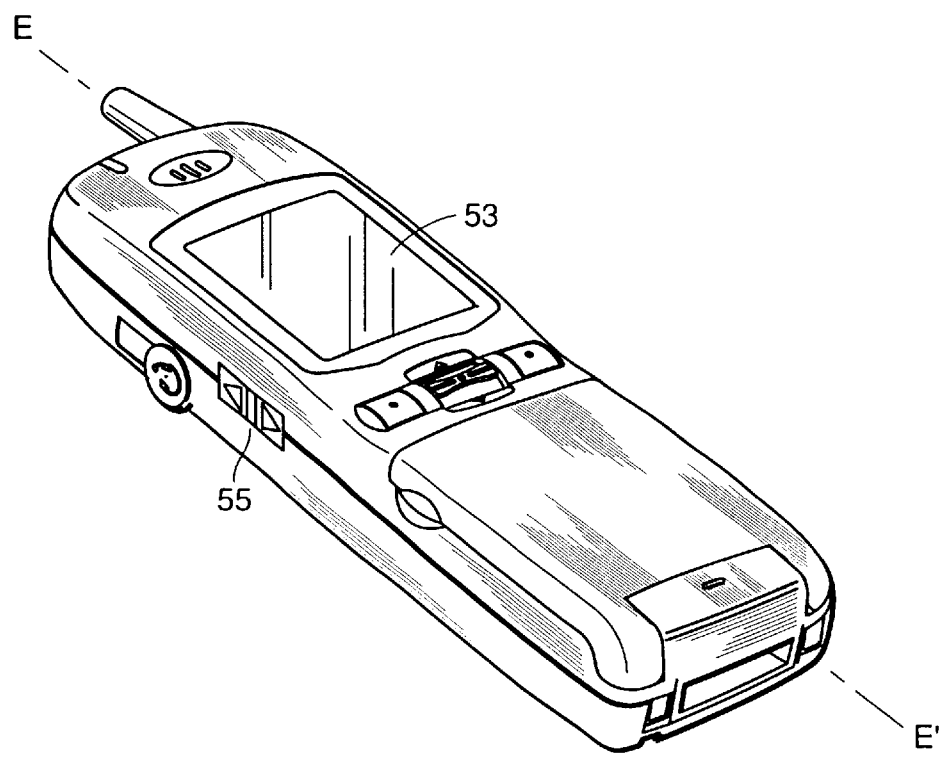
FIG. 55 is an illustration of a mobile phone in accordance with Embodiment 7 of the present invention.
Figure 56:
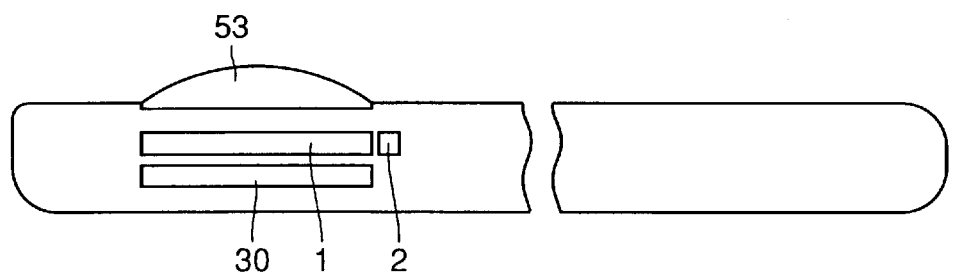
FIG. 56 is a cross section taken along the line E–E' of FIG. 55.
Figure 57A:
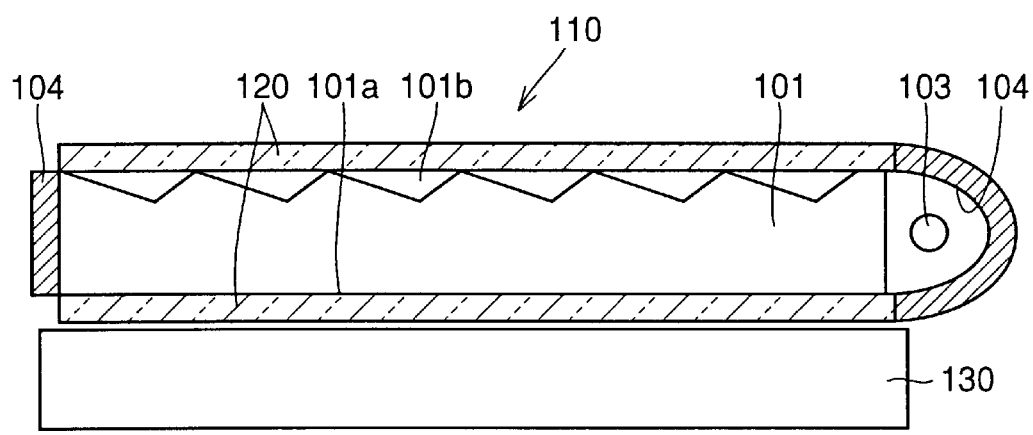
FIG. 57A is a cross section representing the structure of a conventional front light.
Figure 57B:
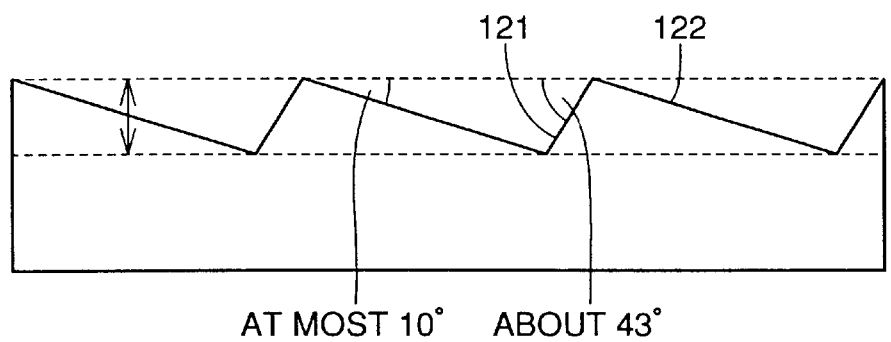
FIG. 57B is an enlarged cross section of the prism-shaped projections as the light extracting structure.
Figure 58A:
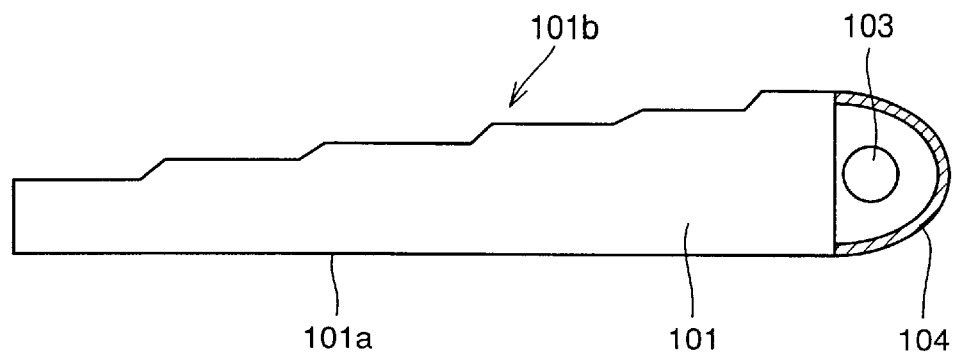
FIG. 58A is a cross section representing a structure of another conventional front light.
Figure 58B:
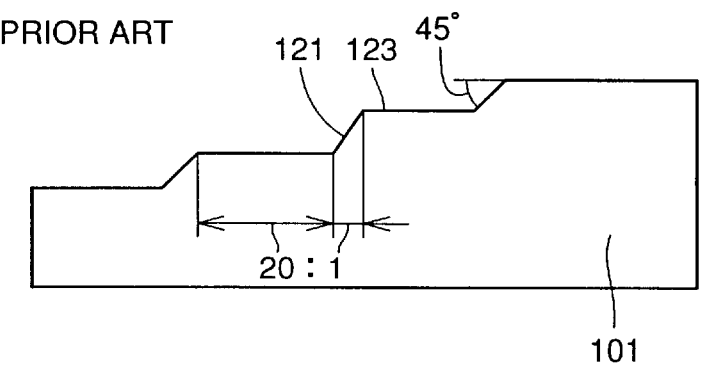
FIG. 58B is an enlarged cross section of the stepwise surface as the light extracting structure.
Figure 59:
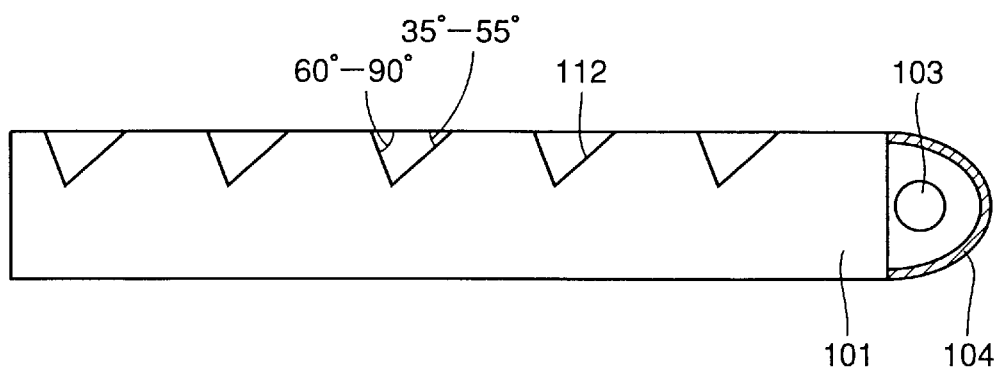
FIG. 59 is a cross section representing the structure of another conventional front light.
Figure 60A:
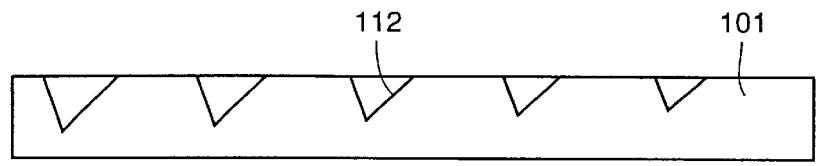
FIG. 60A is a cross section showing a structure in which the depth of the groove is made deeper as it goes further away from the light source.
Figure 60B:
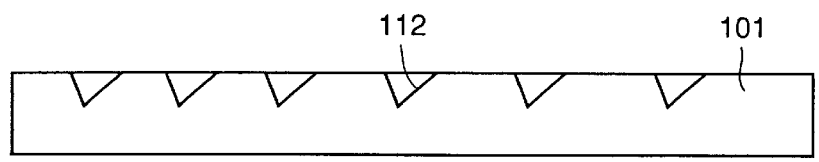
FIG. 60B is a cross section showing a structure in which the pitch between the grooves is made narrower, further away from the light source.
Figure 61A:
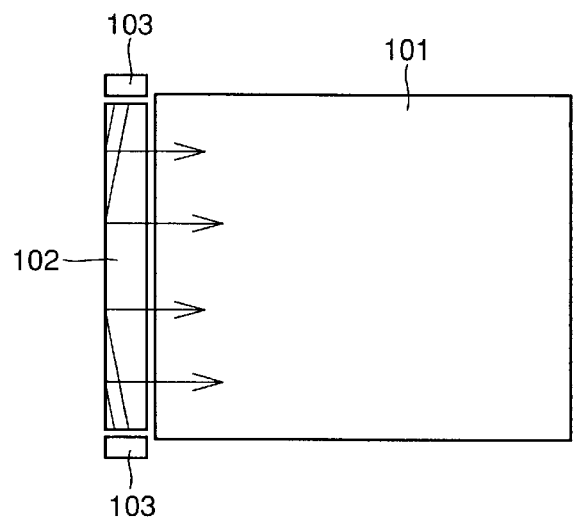
FIG. 61A is a plan view of a conventional front light in which an optical guide mechanism and LEDs positioned at opposing ends are used as the light source for the main optical guide plate.
Figure 61B:
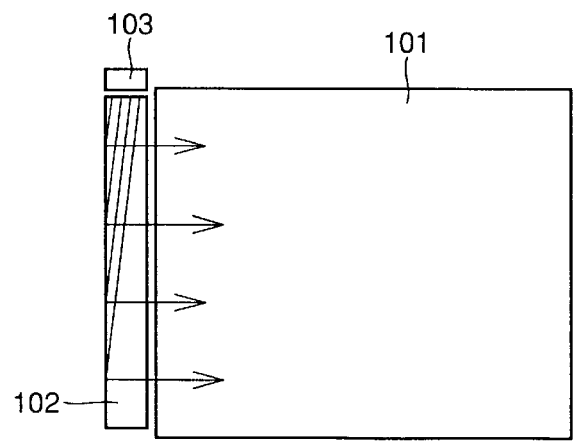
FIG. 61B is a plan view of the conventional front light in which an optical guide mechanism and an LED positioned at one end thereof are used as the light source for the main optical guide plate.

FIG. 55 is a perspective view showing a mobile phone in accordance with Embodiment 7 of the present invention. FIG. 56 is a cross section taken along the line E–E' of FIG. 54. The liquid crystal display device having the front light of the present invention is arranged inside a display screen window 53 of the mobile phone. The mobile phone is provided with a brightness adjustment volume 55, adjusting the output of the LED serving as the light source of the display device. The use of the brightness adjustment volume, the output of the LED can be lowered where it is bright, so that power is saved to make longer the interval of battery charge. When economic consideration is of higher priority, the brightness adjustment volume may not be provided. The main optical guide plate 1, the second optical guide plate 2 and the liquid crystal display device 30 are arranged as shown in FIG. 55. The length of the second optical guide plate is about 40 mm, and the width is within the range of 3 mm to 7 mm.

In the mobile phone incorporating the front light described above, a display image of high brightness can be realized by a small and light weight light source of high efficiency, by using the LED or the like that requires low driving voltage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A front light arranged in front of a display device, comprising:
   a main optical guide plate;
   a second optical guide plate having a longitudinal direction extending along a widthwise direction of and at an end of said main optical guide plate, said second optical guide plate having a first end surface facing said main optical guide plate and a second end surface opposite the first end surface, the second end surface including a plurality of grooves extending in a depth direction, and lying along the longitudinal direction, respective prisms being formed by surfaces of said second optical guide plate located between each adjacent pair of said grooves;
   a point light source arranged at a longitudinal end of said second optical guide plate; and
   a reflective film coating a surface of said grooves.

2. The front light according to claim 1, wherein two of the surfaces forming one of said prisms form an angle of 30° to 38° with a plane including deepest parts of said grooves, when viewed parallel to said grooves.

3. The front light according to claim 1, wherein an area of said second optical guide plate coated with said reflective film extends beyond the end of said main optical guide plate, when said main optical guide plate and said second optical guide plate are viewed in a direction from said second optical guide plate toward said main guide plate.

4. The front light according to claim 1, wherein angles formed by the surfaces forming said grooves varies dependent on distance from said point light source.

5. The front light according to claim 4, wherein the angles become larger at a larger distance from said point light source.

6. The front light according to claim 1, wherein a pitch between said grooves is not larger than pixel pitch of said display device.

7. The front light according to claim 1, wherein the pitch between said grooves is, at most, 0.3 mm.

8. The front light according to claim 1, wherein
   the end of said main optical guide plate toward said second optical guide plate is tapered from opposing sides such that a central portion of the end portion protrudes most toward said second optical guide plate,
   the end surface facing said main optical guide plate of said second optical guide plate is tapered from opposing sides such that a central portion of the end surface is recessed most from said main optical guide plate, conforming to the tapered end of said main optical guide plate, and
   said main optical guide plate and said second optical guide plate are positioned with the tapered ends fitted to each other.

9. The front light according to claim 1, wherein said reflective film is a thin film of a metal chosen from the group consisting of aluminum, silver, gold, copper, and platinum.

10. The front light according to claim 1, wherein said reflective film includes an underlying film on said grooves.

11. The front light according to claim 1, wherein said grooves are roughened.

12. The front light according to claim 1, including a scattering member scattering light beams of said second optical guide plate, arranged on said first end of said second optical guide plate facing said main optical guide plate.

13. The front light according to claim 1, wherein said point light source is a light emitting diode.

14. A reflective liquid crystal display device having a front light on a front side facing a viewer, said front light including
   a main optical guide plate;
   a second optical guide plate having a longitudinal direction extending along a widthwise direction of and at an end of said main optical guide plate, said second optical guide plate having a first end surface facing said main optical guide plate and a second end surface opposite the first end surface, the second end surface including a plurality of grooves extending in a depth direction, and lying along the longitudinal direction, respective prisms being formed by surfaces of said second optical guide plate located between each adjacent pair of said grooves;

a point light source arranged at a longitudinal end of said second optical guide plate; and a reflective film coating a surface of said grooves.

15. The reflective liquid crystal display according to claim 14, wherein two of the surfaces forming one of said prisms form an angle of 30° to 38° with a plane including deepest parts of said grooves, when viewed parallel to said grooves.

16. The reflective liquid crystal display device according to claim 14, wherein an area of said second optical guide plate coated with said reflective film extends beyond the end of said main optical guide plate, when said main optical guide plate and said second optical guide plate are viewed in a direction from said second optical guide plate toward said main guide plate.

17. A personal digital assistant provided with a reflective liquid crystal display device including a front light, said front light including a main optical guide plate;

a second optical guide plate having a longitudinal direction extending along a widthwise direction of and at an end of said main optical guide plate, said second optical guide plate having a first end surface facing said main optical guide plate and a second end surface opposite the first end surface, the second end surface including a plurality of grooves extending in a depth direction, and lying along the longitudinal direction, respective prisms being formed by surfaces of said second optical guide plate located between each adjacent pair of said grooves;

a point light source arranged at a longitudinal end of said second optical guide plate; and a reflective film coating a surface of said grooves.

18. The personal digital assistant according to claim 17, wherein two surfaces forming one of said prisms form an angle of 30° to 38° with a plane including deepest parts of said grooves, when viewed parallel to said grooves.

19. The personal digital assistant according to claim 17, wherein an area of said second optical guide plate coated with said reflective film extends beyond the end of said main optical guide plate, when said main optical guide plate and said second optical guide plate are viewed in a direction from said second optical guide plate toward said main guide plate.

20. The personal digital assistant according to claim 17, wherein said second optical guide plate is, at most, 100 mm in length, and said second optical guide plate has a width in of, at most, 10 mm.

21. An illumination device for a display device, the illumination device comprising:

a display element;

a main optical guide plate radiating light incident on said display element;

a second optical guide plate having a longitudinal direction extending along a widthwise direction of and at an end of said main optical guide plate, said second optical guide plate having a longitudinal length no longer than 100 mm, having a first end surface facing said main optical guide plate, and a second end surface, the second end surface including a plurality of prism-shaped grooves extending in a depth direction and lying along the longitudinal direction;

a point light source at a longitudinal end of said second optical guide plate; and a reflective film coating a surface of said grooves.

22. A front light arranged in front of a display device, comprising:

a main optical guide plate;

a second optical guide plate having a longitudinal direction extending along a widthwise direction of and at an end of said main optical guide plate, said second optical guide plate having a longitudinal direction no longer than 100 mm, having a first end surface facing said main optical guide plate, and a second end surface, the second end surface including a plurality of prism-shaped grooves extending in a depth direction and lying along the longitudinal direction;

a point light source at a longitudinal end of said second optical guide plate; and a reflective film coating a surface of said grooves.

* * * * *